United States Patent
Falahati et al.

(10) Patent No.: US 11,483,876 B2
(45) Date of Patent: Oct. 25, 2022

(54) LBT PARAMETERS FOR UPLINK IN UNLICENSED SPECTRUM

(71) Applicant: Telefonaktiebolaget LM Ericsson (publ), Stockholm (SE)

(72) Inventors: Sorour Falahati, Stockholm (SE); Havish Koorapaty, Saratoga, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/027,354

(22) Filed: Sep. 21, 2020

(65) Prior Publication Data

US 2021/0007136 A1 Jan. 7, 2021

Related U.S. Application Data

(62) Division of application No. 16/325,139, filed as application No. PCT/IB2017/054931 on Aug. 11, 2017, now abandoned.

(Continued)

(51) Int. Cl.
*H04W 74/08* (2009.01)
*H04L 1/18* (2006.01)
(Continued)

(52) U.S. Cl.
CPC ......... *H04W 74/085* (2013.01); *H04L 1/1812* (2013.01); *H04L 1/1822* (2013.01);
(Continued)

(58) Field of Classification Search
CPC .............................. H04W 72/04; H04W 74/08
See application file for complete search history.

(56) References Cited

U.S. PATENT DOCUMENTS

2019/0149270 A1* 5/2019 Liu ................... H04W 72/0446
370/329
2019/0182865 A1 6/2019 Falahati et al.

FOREIGN PATENT DOCUMENTS

CN 104782193 A 7/2015
CN 105122858 A 12/2015
(Continued)

OTHER PUBLICATIONS

First Office Action for Chinese Patent Application No. 201780049425.3, dated Dec. 3, 2020, 11 pages.
(Continued)

*Primary Examiner* — Sulaiman Nooristany
(74) *Attorney, Agent, or Firm* — Withrow & Terranova, PLLC

(57) ABSTRACT

According to some embodiments, a method for use in a user equipment (UE) of managing a listen-before-talk (LBT) contention window size comprises transmitting a first burst of uplink subframes after a first LBT procedure performed using an LBT contention window size, and determining a reference subframe based on the first burst. The reference subframe is associated with a reference hybrid automatic repeat request (HARQ) process identifier. The method further comprises receiving scheduling for a second burst of uplink subframes. The scheduling comprises an associated HARQ process identifier and an associated new data indicator (NDI) for each subframe. When the UE determines the HARQ process identifier associated with at least one of the subframes of the second burst matches the reference HARQ process identifier, then if the associated NDI indicates new data, the method resets the LBT contention window size, else the method increments the LBT contention window size.

12 Claims, 16 Drawing Sheets

1400

1412 - receive a first burst of uplink subframes from a UE after a first LBT procedure, each subframe of the first burst of uplink subframes associated with one or more transport blocks, and each transport block associated with a reference hybrid automatic repeat request (HARQ) process identifier 1414 - determine a set of transport blocks in the first burst of uplink subframes that were not received successfully by the network node 1416 - before scheduling the UE with a second LBT procedure, schedule the UE with a second burst of uplink frames using all the HARQ process identifiers associated with the transport blocks in the determined set of transport blocks

Related U.S. Application Data

(60) Provisional application No. 62/374,697, filed on Aug. 12, 2016.

(51) Int. Cl.
  *H04W 72/04* (2009.01)
  *H04W 74/00* (2009.01)

(52) U.S. Cl.
  CPC ....... *H04L 1/1887* (2013.01); *H04W 72/0446* (2013.01); *H04W 74/004* (2013.01); *H04W 74/0808* (2013.01)

(56) References Cited

FOREIGN PATENT DOCUMENTS

| | | |
|---|---|---|
| EP | 1718098 A1 | 11/2006 |
| EP | 2529514 B1 | 4/2016 |

OTHER PUBLICATIONS

Intention to Grant for European Patent Application No. 17768514.6, dated Apr. 1, 2021, 5 pages.
3GPP TS 36.211, V11.4.0, "3rd Generation Partnership Project; Technical Specification Group Radio Access Network; Evolved Universal Terrestrial Radio Access (E-UTRA); Physical Channels and Modulation, Release 11," Sep. 2013, 120 pages.
3GPP TS 36.213, V11.4.0, 3rd Generation Partnership Project; Technical Specification Group Radio Access Network; Evolved Universal Terrestrial Radio Access (E-UTRA); Physical layer procedures, Release 11, Sep. 2013, 182 pages.
3GPP TS 36.331, V11.5.0, "3rd Generation Partnership Project; Technical Specification Group Radio Access Network; Evolved Universal Terrestrial Radio Access (E-UTRA); Radio Resource Control (RRC), Release 11," Sep. 2013, 347 pages.
Ericsson, "R1-165157: On UL Channel Access Procedures", 3GPP TSG-RAN WG1 Meeting #85, May 23-27, 2016, Nanjing, China, 7 pages.
Ericsson, "R1-165159: On Signaling of UL Channel Access Parameters," 3GPP TSG RAN WG1 Meeting #85, May 23-27, 2016, Nanjing, China, 6 pages.
Ericsson et al., "R1-165713: WF on CW adjustment for UL LBT based on Cat. 4", 3GPP TSG-RAN WG1 Meeting #85, , May 23-27, 2016, Nanjing, China, 4 pages.
Ericsson, "R1-167723: On Contention Window Adjustment for Category 4 UL LBT," 3GPP TSG-RAN WG1#86, Aug. 22-26, 2016, Gothenburg, Sweden, 6 pages.
Huawei et al., "R1-164073: Contention window size adjustment for UL category 4 LBT for eLAA", 3GPP TSG-RAN WG1 Meeting 85, May 23-27, 2016, Nanjing, China, 4 pages.
Nokia et al., R1-165948: WF on the CWS adjustment at the UE for Cat-4 LBT, 3GPP TSG RAN WG1 #85, May 23-27, 2016, Nanjing, China, 3 pages.
Notice of Reasons for Refusal for Japanese Patent Application No. 2019-505031, dated Feb. 7, 2020, 9 pages.
Office Action for Russian Patent Application No. 2019106650/08, dated Jan. 20, 2020, 7 pages.
International Search Report and Written Opinion for International Patent Application No. PCT/IB2017/054931, dated Jan. 25, 2018, 16 pages.
International Preliminary Report on Patentability for International Patent Application No. PCT/IB2017/054931, dated Feb. 21, 2019, 13 pages.
Non-Final Office Action and Applicant-Initiated Interview Summary for U.S. Appl. No. 16/325,139, dated May 20, 2020, 12 pages.

\* cited by examiner

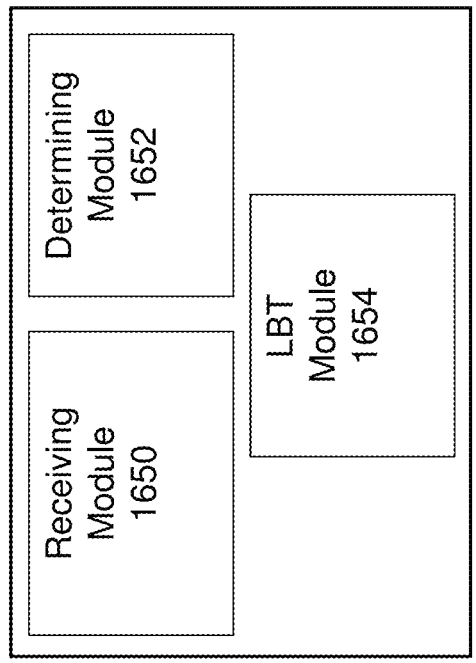
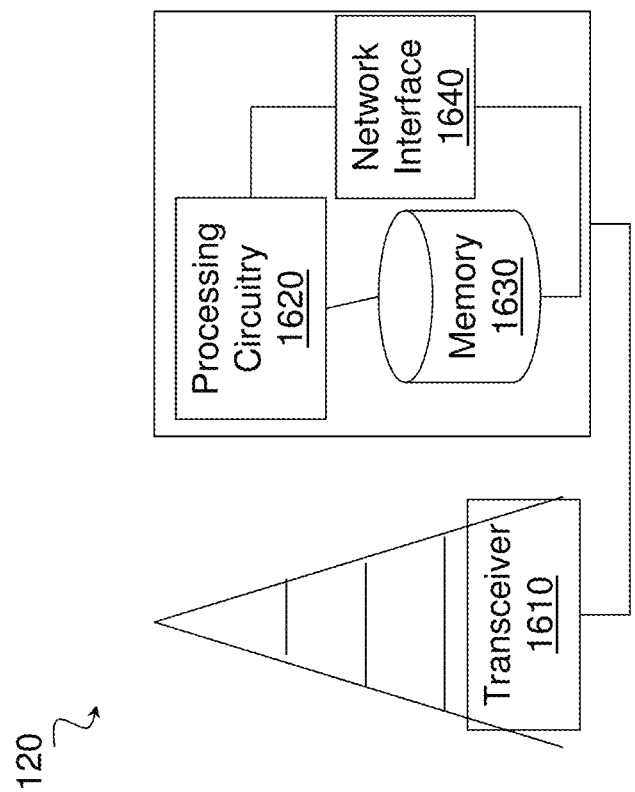
Fig. 16B
Fig. 16A

LBT PARAMETERS FOR UPLINK IN UNLICENSED SPECTRUM

This application is a divisional of U.S. patent application Ser. No. 16/325,139, filed Feb. 12, 2019, which is a National Phase Entry of PCT/IB2017/054931, filed Aug. 11, 2017, which claims the benefit of US Provisional Application No. 62/374,697, filed Aug. 12, 2016, the disclosures of which are fully incorporated herein by reference.

TECHNICAL FIELD

Particular embodiments are directed to wireless communications and, more particularly, to methods and apparatus for signaling and management of listen-before-talk (LBT) parameters for uplink transmission in unlicensed spectrum.

INTRODUCTION

The Third Generation Partnership Project (3GPP) initiative referred to as License Assisted Access (LAA) enables long term evolution (LTE) equipment to operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

The standalone LTE-U forum and 3GPP Rel-14 work item on Uplink Licensed-Assisted Access (LAA) may specify that LTE user equipment (UEs) may transmit on the uplink in the unlicensed 5 GHz or license-shared 3.5 GHz radio spectrum. For the case of standalone LTE-U, all downlink and uplink transmissions take place entirely on the unlicensed spectrum.

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission medium for a pre-defined minimum amount of time and backing off if the channel is busy.

Wi-Fi, LAA and Standalone LTE-U may operate in multi-carrier mode with simultaneous transmission across multiple unlicensed channels in the 5 GHz band. Wi-Fi follows a hierarchical multi-carrier LBT scheme across multiple carriers which are selected using specific channel bonding rules.

For LAA and Standalone LTE-U, uplink transmissions are explicitly scheduled by the eNB, which has full control over when UEs are allowed to transmit. For carriers operating in unlicensed spectrum, however, UEs perform a form of LBT before transmitting on the carrier. The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission. The signaling parameters, however, do not fully encompass all the use cases and problems that may be encountered for uplink transmissions in unlicensed spectrum.

Particular embodiments described below include more signaling methods to solve these problems and address the new use cases. In addition, the particular embodiments describe signaling parameters that may be used to increase efficiency of LTE in unlicensed spectrum.

As background, LTE uses OFDM in the downlink and discrete Fourier transform (DFT)-spread OFDM (also referred to as single-carrier FDMA) in the uplink. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. An uplink subframe has the same subcarrier spacing as the downlink and the same number of SC-FDMA symbols in the time domain as OFDM symbols in the downlink. In the time domain, LTE downlink transmissions are organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 μs.

Resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. In each subframe a base station transmits control information about which terminals data is transmitted to and upon which resource blocks the data is transmitted in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

FIG. 3 illustrates an example downlink subframe. The subframe includes reference symbols and control signaling. In the illustrated example, the control region includes 3 OFDM symbols (i.e., CFI=3). The reference symbols include cell specific reference symbols (CRS), which may support multiple functions including fine time and frequency synchronization and channel estimation for certain transmission modes.

For LTE Rel-8 to Rel-10, a base station schedules downlink transmissions using a Physical Downlink Control Channel (PDCCH). From LTE Rel-11 and onwards, downlink transmissions may also be scheduled on an Enhanced Physical Downlink Control Channel (EPDCCH).

The PDCCH/EPDCCH carries downlink control information (DCI) such as scheduling decisions and power-control commands. For example, the DCI includes downlink scheduling assignments such as Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ (HARQ) acknowledgements in response to downlink scheduling assignments. The DCI may also include uplink scheduling grants such as Physical Uplink Shared Channel (PUSCH) resource indication, transport format, and hybrid-ARQ-related information. An uplink scheduling grant also includes a command for power control of the PUSCH. The DCI may also include power control commands for a set of terminals as a complement to the commands included in the scheduling assignments/grants.

One PDCCH/EPDCCH carries one DCI message containing one of the groups of information listed above. Because a base station may schedule multiple terminals simultaneously, and each terminal may be scheduled on both downlink and uplink simultaneously, multiple scheduling messages may be transmitted within each subframe. Each scheduling message is transmitted on separate PDCCH/EPDCCH resources. Consequently, multiple simultaneous PDCCH/EPDCCH transmissions are typically within each subframe in each cell. Furthermore, support for different radio-channel conditions may use link adaptation. In link adaptation the code rate of the PDCCH/EPDCCH is selected by adapting the resource usage for the PDCCH/EPDCCH to match the radio-channel conditions.

In LTE, the eNB transmits the uplink transmission scheduling command to the UE. The LTE standard specifies a fixed delay between the time the scheduling command is transmitted and the time the UE transmits the uplink signal. This delay provides the UE time to decode the PDCCH/EPDCCH and prepare the uplink signal for transmission. For a frequency division duplex (FDD) serving cell, the uplink grant delay is 4 ms. For a time division duplex (TDD) serving cell, the uplink grant delay can be greater than 4 ms.

The LTE Rel-10 standard and above supports bandwidths larger than 20 MHz. One requirement of LTE Rel-10 is backward compatibility with LTE Rel-8. This includes spectrum compatibility. One way to provide compatibility is for an LTE Rel-10 carrier wider than 20 MHz to appear as a number of LTE carriers to an LTE Rel-8 terminal. Each such carrier may be referred to as a Component Carrier (CC).

For early LTE Rel-10 deployments, the number of LTE Rel-10-capable terminals will likely be smaller than the number of LTE legacy terminals already in existence. Thus, efficient use of a wide carrier is needed for legacy terminals, i.e. providing carriers where legacy terminals may be scheduled in all parts of the wideband LTE Rel-10 carrier. One solution uses carrier aggregation. Using carrier aggregation, an LTE Rel-10 terminal may receive multiple component carriers. The components carriers may have the same structure as a Rel-8 carrier.

FIG. 4 illustrates an example of carrier aggregation. A system bandwidth of 100 MHz may be represented by 5 component carriers each with 20 MHz bandwidth. A UE capable of carrier aggregation may be assigned a primary cell (PCell), which is always activated, and one or more secondary cells (SCells) which may be activated or deactivated dynamically.

The number of aggregated component carriers as well as the bandwidth of the individual component carriers may be different for uplink and downlink. A symmetric configuration refers to a configuration where the number of component carriers in downlink is the same as in uplink. An asymmetric configuration refers to a configuration where the number of component carriers is different between downlink and uplink. The number of component carriers configured in a cell may be different from the number of component carriers seen by a terminal. For example, a terminal may support more downlink component carriers than uplink component carriers, even though the cell is configured with the same number of uplink and downlink component carriers.

Another feature of carrier aggregation is the ability to perform cross-carrier scheduling. Cross-carrier scheduling enables a (E)PDCCH on one component carrier to schedule data transmissions on another component carrier using a 3-bit Carrier Indicator Field (CIF) inserted at the beginning of the (E)PDCCH messages. For data transmissions on a given component carrier, a UE expects to receive scheduling messages on the (E)PDCCH of just one component carrier (i.e., either the same component carrier, or a different component carrier via cross-carrier scheduling). The mapping from (E)PDCCH to PDSCH may be configured semi-statically.

Another wireless network technology that may share unlicensed spectrum with LTE is a wireless local area network (WLAN). Typical WLAN deployments use carrier sense multiple access with collision avoidance (CSMA/CA) for medium access. This means that the channel is sensed to perform a clear channel assessment (CCA), and a transmission is initiated only if the channel is determined to be idle. If the channel is determined to be busy, then the transmission is deferred until the channel is idle. When the range of several access points using the same frequency overlap, all transmissions related to one access point might be deferred when a transmission on the same frequency to or from another access point which is within range is detected. Effectively, if several access points are within range of each other, they will need to share the channel in time, and the throughput for the individual access points may be severely degraded. A general illustration of the listen-before-talk (LBT) mechanism on a single unlicensed channel is shown in FIG. 5.

FIG. 5 illustrates an example WLAN listen-before-talk mechanism. In the case of single-channel LBT, after a first Wi-Fi station transmits a data frame to a second Wi-Fi station, the second station transmits an ACK frame back to the first station with a delay of 16 µs. The ACK frame is transmitted by the second station without performing an LBT operation. To prevent another station interfering with the ACK frame transmission, a station defers for a duration of 34 µs (referred to as DIFS) after the channel is observed to be occupied before assessing again whether the channel is occupied.

Thus, a station that wishes to transmit first performs a clear channel assessment by sensing the medium for a fixed duration DIFS. If the medium is idle, then the station assumes that it may take ownership of the medium and begins a frame exchange sequence. If the medium is busy, the station waits for the medium to go idle, defers for DIFS, and waits for a further random backoff period. To further prevent a station from occupying the channel continuously and thereby preventing other stations from accessing the channel, after a successful transmission, a station performs a random backoff before transmitting again.

For multi-carrier operation, Wi-Fi uses a hierarchical channel bonding scheme to determine its transmission bandwidth for a frame, which could be 20 MHz, 40 MHz, 80 MHz, or 160 MHz, for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the contention window-based random access procedure after a defer period, if necessary, and then counts down the random number generated. The secondary channels perform a quick CCA check for a PIFS duration (generally 25 μs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions (i.e., transmission on secondary channels alone is not allowed).

LTE has traditionally used dedicated frequency spectrum. An advantage of dedicated spectrum is that an LTE system does not need to coexist with other non-3GPP radio access technologies in the same spectrum, which can maximize spectrum efficiency. The spectrum allocated to LTE, however, is limited. It may not meet the ever increasing demand for larger throughput from applications/services. Therefore, 3GPP also specifies how LTE may use unlicensed spectrum in addition to licensed spectrum. In addition, Standalone LTE-U is under development by the MulteFire Alliance, in which LTE operates solely in unlicensed spectrum.

FIG. 6 illustrates a user equipment with license assisted access to unlicensed spectrum. In license assisted access, a UE is connected to a PCell in the licensed band and one or more SCells in the unlicensed band. A secondary cell in unlicensed spectrum may be referred to as a LAA secondary cell (LAA SCell). The LAA SCell may operate in downlink-only mode or operate with both uplink and downlink traffic. In some scenarios, LTE nodes may operate in standalone mode in license-exempt channels without assistance from a licensed cell.

Unlicensed spectrum can, by definition, be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893). An example is illustrated in FIG. 7.

FIG. 7 illustrates an example of uplink license assisted access transmissions based on an uplink listen-before-talk protocol. The example illustrates a duration of a transmission burst on an LAA SCell constrained by a maximum allowed transmission duration of 4 ms. For example, the illustration divides an 8 ms occupancy time into 4 ms for downlink channel occupancy and 4 ms for uplink channel occupancy.

Before the eNB transmits data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time. For example, after receiving a downlink transmission in subframes n-4 to n-1 (i.e., 4 ms), the UE performs a clear channel access for the uplink at subframe n. If the channel is clear, the UE transmits in uplink for subframes n to n+3 (i.e., 4 ms).

When an eNB obtains an opportunity to transmit in unlicensed spectrum, the opportunity (also referred to as a transmit opportunity (TXOP)), may be shared with UEs that the eNB is serving. Transitions between transmissions from the eNB to transmissions from UEs may be handled in two ways, one where the UEs perform an LBT operation prior to transmission and one where the UEs do not perform an LBT operation.

The case where an LBT operation is not performed will most likely need the gap between downlink transmissions (from the eNB) and uplink transmissions (from the UE(s)) to be no more than 16 μs. When an LBT operation is to be performed for a particular subframe, gaps will need to be inserted in the uplink subframes to allow for the UE to perform a listen-before-talk operation without being interfered by transmissions from other UEs in the same serving cell. To avoid significantly degrading uplink throughput, the gaps should not be too large. Therefore, the gap in an uplink subframe of 14 DFT spread OFDM (DFTS-OFDM) symbols is likely to not be larger than one DFTS-OFDM symbol, which is approximately 71 microseconds in duration.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval {0, CW}, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic. For the highest priority class, the {CWmin, CWmax} values may be limited to {3, 7} where these numbers are counted in increments of one slot which has a duration of 9 microseconds as shown in FIG. 5. There are four defined priority classes. The remaining three priority classes use contention window size pairs of {7, 15}, {15, 63} and {15, 1023 }, respectively, for an access point (AP) or an eNB. For Wi-Fi STAs or UEs in LTE, the values of {15, 63} are not used.

In the second type of LBT procedure, a UE may perform an LBT operation for a fixed duration (e.g., 25 μs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

One technique to minimize gaps between downlink and uplink transmissions is to use a timing advance command to advance the timing of the UEs transmissions on the uplink so that they occur earlier. This technique may be used where the eNB may employ transmissions only over a part of the subframe in the last downlink subframe of a transmission burst. In this case, there is a gap within the downlink subframe that can be occupied by uplink transmissions by UEs that have received timing advance (TA) commands.

The use of LTE carrier aggregation (CA), introduced in Rel-10, may increase the peak data rate, system capacity, and user experience by aggregating radio resources from multiple carriers that may reside in the same band or different bands. Rel-13 LAA and Standalone LTE-U offer an ability to operate on multiple carriers in unlicensed spectrum simultaneously. The extension of the CA framework beyond 5 carriers was completed in LTE Rel-13, which supports up to 32 carriers in both uplink and downlink.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE. The contention window sizes to be used at the UE can also be implicitly signaled by indicating whether the transmission is a new transmission or a retransmission.

Existing signaling and contention window management methods, however, do not fully account for the problems that arise when using implicit signaling to indicate contention window size that the UE must use. When explicit signaling is used, it creates unnecessarily large signaling overhead.

SUMMARY

The embodiments described herein include efficiently signaling listen-before-talk (LBT) parameters for a Category 4 LBT scheme to a user equipment (UE), while ensuring that requirements on management of contention windows are met. Signaling to enable the functionality is disclosed. In general, the contention window adjustment is based on the radio conditions experienced during the beginning of a transmission. For example, if the transmission after a successful Category 4 LBT experiences collision, the corresponding contention window size is increased for the next Category 4 LBT attempt.

Some embodiments include implicit signaling with contention window management at the UE with the following elements: (1) use of the NDI bit for a HARQ process for which information is available in a previously scheduled burst, and (2) use of a UE's knowledge of the LBT failure or success for subframes of the previously scheduled burst for the UE. The following embodiments include managing the contention window size of a Category 4 LBT scheme used by a UE in a particular uplink subframe.

According to some embodiments, a method for use in a user equipment (UE) of managing a listen-before-talk (LBT) contention window size comprises transmitting a first burst of uplink subframes after a first LBT procedure. The LBT procedure is performed using an LBT contention window size. The method further comprises determining a reference subframe based on the first burst of uplink subframes. The reference subframe is associated with a reference hybrid automatic repeat request (HARQ) process identifier. The method further comprises receiving scheduling for a second burst of uplink subframes. The scheduling comprises, for each subframe of the second burst of uplink subframes, an associated HARQ process identifier and an associated new data indicator (NDI). When the UE determines the HARQ process identifier associated with at least one of the subframes of the second burst of uplink subframes matches the reference HARQ process identifier and the associated NDI indicates new data, the method resets the LBT contention window size to a minimum value. When the UE determines the HARQ process identifier associated with at least one of the subframes of the second burst of uplink subframes matches the reference HARQ process identifier and the associated NDI indicates a retransmission, the method increments the LBT contention window size. The method further comprises performing a second LBT procedure using the contention window size.

In particular embodiments, determining the reference subframe comprises determining a most recently transmitted uplink subframe in the first burst of uplink subframes for which the associated HARQ process identifier is also found in the received scheduling for the second burst of uplink subframes.

In particular embodiments, determining the reference subframe comprises determining the first transmitted subframe of the first burst of uplink subframes for which the HARQ process identifier associated with the first subframe of the first burst of uplink subframes is also found in the received scheduling for the second burst of uplink subframes.

In particular embodiments, transmission of the first burst ended more than a threshold time (e.g., 4 ms) prior to determining the reference subframe.

In particular embodiments, resetting the LBT contention window size to a minimum value comprises resetting the LBT contention window size to a minimum value of a set of values associated with a priority class used by the UE to perform the first LBT procedure. Resetting the LBT contention window size to a minimum value may comprise resetting LBT contention window sizes associated with all priority classes used by the UE.

In particular embodiments, incrementing the LBT contention window size comprises incrementing the LBT contention window size to a next value in a set of values associated with a priority class used by the UE to perform the first LBT procedure. Incrementing the LBT contention window size may comprise incrementing LBT contention window sizes associated with all priority classes used by the UE.

In particular embodiments, the reference subframe is associated with a plurality of HARQ process identifiers and the LBT contention window size is incremented when the NDI associated with each HARQ process identifier of the plurality of HARQ identifiers indicates a retransmission. In some embodiments, the LBT contention window size is reset when at least one NDI associated with a HARQ process identifier of the plurality of HARQ identifiers indicates new data.

In particular embodiments, performing the second LBT procedure comprises performing a Category 4 LBT for physical uplink shared channel (PUSCH) transmission on a licensed assisted access (LAA) secondary cell.

According to some embodiments, a UE capable of managing a LBT contention window size comprises processing circuitry operable to transmit a first burst of uplink subframes after a first LBT procedure. The LBT procedure is performed using an LBT contention window size. The processing circuitry is further operable to determine a reference subframe based on the first burst of uplink subframes. The reference subframe is associated with a reference HARQ process identifier. The processing circuitry is further operable to receive scheduling for a second burst of uplink subframes. The scheduling comprises, for each subframe of the second burst of uplink subframes, an associated HARQ process identifier and an associated NDI. When the UE determines the HARQ process identifier associated with at least one of the subframes of the second burst of uplink subframes matches the reference HARQ process identifier and the associated NDI indicates new data, the processing circuitry is operable to reset the LBT contention window size to a minimum value. When the UE determines the HARQ process identifier associated with at least one of the subframes of the second burst of uplink subframes matches the reference HARQ process identifier and the associated NDI indicates a retransmission, the processing circuitry is operable to increment the LBT contention window size. The processing circuitry is further operable to perform a second LBT procedure using the contention window size.

In particular embodiments, the processing circuitry is operable to determine the reference subframe by determining a most recently transmitted uplink subframe in the first burst of uplink subframes for which the associated HARQ process identifier is also found in the received scheduling for the second burst of uplink subframes.

In particular embodiments, the processing circuitry is operable to determine the reference subframe by determining the first transmitted subframe of the first burst of uplink subframes for which the HARQ process identifier associated with the first subframe of the first burst of uplink subframes is also found in the received scheduling for the second burst of uplink subframes.

In particular embodiments, transmission of the first burst ended more than a threshold time (e.g., 4 ms) prior to determining the reference subframe.

In particular embodiments, the processing circuitry is operable to reset the LBT contention window size to a minimum value by resetting the LBT contention window size to a minimum value of a set of values associated with a priority class used by the UE to perform the first LBT procedure. In some embodiments, the processing circuitry is operable to reset the LBT contention window size to a minimum value by resetting LBT contention window sizes associated with all priority classes used by the UE.

In particular embodiments, the processing circuitry is operable to increment the LBT contention window size by incrementing the LBT contention window size to a next value in a set of values associated with a priority class used by the UE to perform the first LBT procedure. In some embodiments, the processing circuitry is operable to increment the LBT contention window size by incrementing LBT contention window sizes associated with all priority classes used by the UE.

In particular embodiments, the reference subframe is associated with a plurality of HARQ process identifiers and the LBT contention window size is incremented when the NDI associated with each HARQ process identifier of the plurality of HARQ identifiers indicates a retransmission. In some embodiments, the LBT contention window size is reset when at least one NDI associated with a HARQ process identifier of the plurality of HARQ identifiers indicates new data.

In particular embodiments, the processing circuitry is operable to perform the second LBT procedure by performing a Category 4 LBT for PUSCH transmission on a LAA secondary cell.

According to some embodiments, a method for use in a network node of signaling LBT parameters comprises receiving a first burst of uplink subframes from a UE after a first LBT procedure. Each subframe of the first burst of uplink subframes is associated with one or more transport blocks, and each transport block is associated with a HARQ process identifier. The method further comprises determining a set of transport blocks in the first burst of uplink subframes that were not received successfully by the network node. Before scheduling the UE with a second LBT procedure, the method further comprises scheduling the UE with a second burst of uplink frames using all the HARQ process identifiers associated with the transport blocks in the determined set of transport blocks.

In particular embodiments, determining the set of transport blocks in the first burst of uplink subframes that were not received successfully by the network node comprises determining a reference subframe based on the last subframe before a received subframe in which at least one transport block was received successfully. The set of transport blocks includes the transport blocks in the reference subframe that were not received successfully.

According to some embodiments, a network node operable to signal LBT parameters comprises processing circuitry operable to receive a first burst of uplink subframes from a UE after a first LBT procedure. Each subframe of the first burst of uplink subframes is associated with one or more transport blocks, and each transport block is associated with a HARQ process identifier. The processing circuitry is further operable to determine a set of transport blocks in the first burst of uplink subframes that were not received successfully by the network node. Before scheduling the UE with a second LBT procedure, the processing circuitry is further operable to schedule the UE with a second burst of uplink frames using all the HARQ process identifiers associated with the transport blocks in the determined set of transport blocks.

In particular embodiments, the processing circuitry is operable to determine a reference subframe based on the last subframe before a received subframe in which at least one transport block was received successfully. The set of transport blocks includes the transport blocks in the reference subframe that were not received successfully.

According to some embodiments, a UE capable of managing a LBT contention window size comprises a transmitting module, a determining module, a receiving module, and an LBT module. The transmitting module is operable to transmit a first burst of uplink subframes after a first LBT procedure. The LBT procedure is performed using an LBT contention window size. The determining module operable to determine a reference subframe based on the first burst of uplink subframes. The reference subframe is associated with a reference HARQ process identifier. The receiving module is operable to receive scheduling for a second burst of uplink subframes. The scheduling comprises, for each subframe of the second burst of uplink subframes, an associated HARQ process identifier and an associated NDI. When the UE determines the HARQ process identifier associated with at least one of the subframes of the second burst of uplink subframes matches the reference HARQ process identifier and the associated NDI indicates new data, the LBT module is operable to reset the LBT contention window size to a minimum value. When the UE determines the HARQ process identifier associated with at least one of the subframes of the second burst of uplink subframes matches the reference HARQ process identifier and the associated NDI indicates a retransmission, the LBT module is operable to increment the LBT contention window size. The LBT module is further operable to perform a second LBT procedure using the contention window size.

According to some embodiments, a network node operable to signal LBT parameters comprises a receiving module, a determining module, and an LBT module. The receiving module is operable to receive a first burst of uplink subframes from a UE after a first LBT procedure. Each subframe of the first burst of uplink subframes is associated with one or more transport blocks, and each transport block is associated with a HARQ process identifier. The determining module is operable to determine a set of transport blocks in the first burst of uplink subframes that were not received successfully by the network node. Before scheduling the UE with a second LBT procedure, the LBT module is operable to schedule the UE with a second burst of uplink frames using all the HARQ process identifiers associated with the transport blocks in the determined set of transport blocks.

Also disclosed is a computer program product. The computer program product comprises instructions stored on non-transient computer-readable media which, when executed by a processor, perform the act of transmitting a first burst of uplink subframes after a first LBT procedure. The LBT procedure is performed using an LBT contention window size. The instructions are further operable to perform the act of determining a reference subframe based on the first burst of uplink subframes. The reference subframe is associated with a reference hybrid automatic repeat request (HARQ) process identifier. The instructions are further operable to perform the act of receiving scheduling for a second burst of uplink subframes. The scheduling comprises, for each subframe of the second burst of uplink subframes, an associated HARQ process identifier and an associated new data indicator (NDI). When the UE determines the HARQ process identifier associated with at least one of the subframes of the second burst of uplink subframes matches the reference HARQ process identifier and the associated NDI indicates new data, the instructions are further operable to perform the act of resetting the LBT contention window size to a minimum value. When the UE determines the HARQ process identifier associated with at least one of the subframes of the second burst of uplink subframes matches the reference HARQ process identifier and the associated NDI indicates a retransmission, the instructions are further operable to perform the act of incrementing the LBT contention window size. The instructions are further operable to perform the act of performing a second LBT procedure using the contention window size.

Another computer program product comprises instructions stored on non-transient computer-readable media which, when executed by a processor, perform the act of receiving a first burst of uplink subframes from a UE after a first LBT procedure. Each subframe of the first burst of uplink subframes is associated with one or more transport blocks, and each transport block is associated with a HARQ process identifier. The instructions are further operable to perform the act of determining a set of transport blocks in the first burst of uplink subframes that were not received successfully by the network node. Before scheduling the UE with a second LBT procedure, the instructions are further operable to perform the act of scheduling the UE with a second burst of uplink frames using all the HARQ process identifiers associated with the transport blocks in the determined set of transport blocks.

Particular embodiments may exhibit some of the following technical advantages. For example, particular embodiments may improve uplink and/or system performance by reducing the amount of signaling, which may reduce network load and device complexity. In some embodiments, a network node may closely track the contention window adjustment at the wireless device. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 16A is a block diagram illustrating an example embodiment of a network node; and FIG. 16B is a block diagram illustrating example components of a network node.

DETAILED DESCRIPTION

Figure 1:
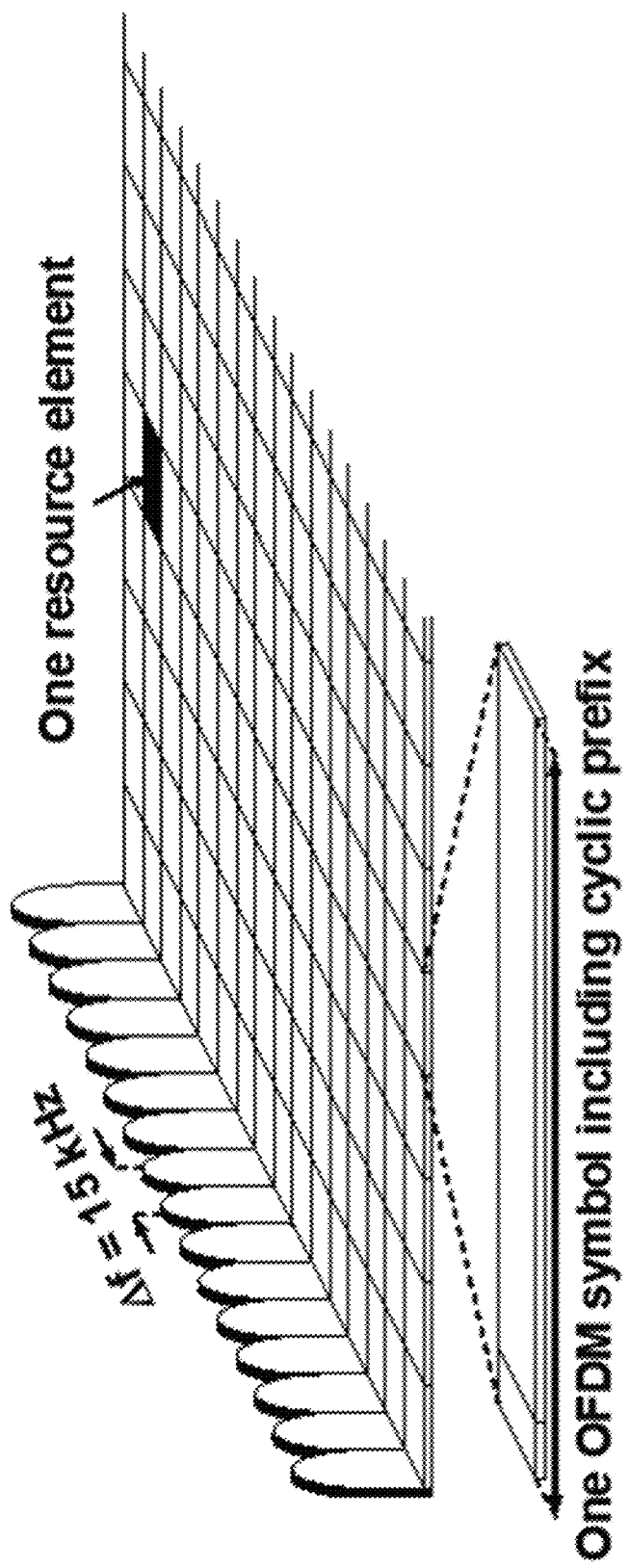
FIG. 1 illustrates an example OFDM symbol.

Long term evolution (LTE) equipment may operate in the unlicensed 5 GHz radio spectrum according to the Third Generation Partnership Project (3GPP) initiative referred to as License Assisted Access (LAA). The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell).

Regulatory requirements may not permit transmissions in the unlicensed spectrum without prior channel sensing. Wireless devices may perform channel sensing using a listen-before-talk (LBT) method. The LBT method includes sensing the transmission The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission. The signaling parameters, however, do not fully encompass all the use cases and problems that may be encountered for uplink transmissions in unlicensed spectrum.

Before an eNB transmits data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval {0, CW}, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic.

In the second type of LBT procedure, a UE may perform an LBT operation for a fixed duration (e.g., 25 μs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE. The contention window sizes to be used at the UE can also be implicitly signaled by indicating whether the transmission is a new transmission or a retransmission.

Existing signaling and contention window management methods, however, do not fully account for the problems that arise when using implicit signaling to indicate contention window size that the UE must use. When explicit signaling is used, it creates unnecessarily large signaling overhead. In consideration of these issues, certain embodiments efficiently signal LBT parameters for a Category 4 LBT scheme to a UE, while meeting the requirements for management of contention windows.

In general, the contention window adjustment is based on the radio conditions experienced at the beginning of a transmission. For example, if the transmission after a successful Category 4 LBT experiences collision, the corresponding contention window size is increased for the next Category 4 LBT attempt. However, conventional signaling and contention window management methods which are adopted at the UE or at the eNB suffer from the misinterpretation in the available information at the other side. If the UE fails in LBT and does not transmit anything, or if the UE transmits, but the transmission is heavily interfered with, then the eNB fails to detect a valid transmission from the UE. The eNB cannot distinguish between transmission failure and transmission with collision, where only the latter should contribute to the contention window adjustment.

Particular embodiments obviate the problems described above and include adjusting LBT parameters, such as a contention window size for a Category 4 LBT scheme, using implicit signaling provided by an eNB and the UEs knowledge of its transmission. The following general embodiments for managing the contention window size of a Category 4 LBT scheme used by a UE in a particular uplink subframe are described.

Some embodiments include implicit signaling with contention window management at the UE. For example, particular embodiments use a new data indicator (NDI) bit for a hybrid automatic repeat request (HARD) process for which information is available in a previously scheduled burst. Particular embodiments may also use a UE's knowledge of the LBT failure or success for subframes of the previously scheduled burst for the UE.

Particular embodiments may improve uplink and/or system performance by reducing the amount of signaling, which may reduce network load and device complexity. No additional signaling overhead is needed to manage the contention window size. An eNB can closely track the contention window adjustment at the UE.

The embodiments described herein are applicable to both LAA LTE and standalone LTE-U operation, and in general for any system such as LTE operating in unlicensed spectrum or any spectrum where listen-before-talk protocols are used and where there is some fixed timing where transmissions occur.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 8-16B of the drawings, like numerals being used for like and corresponding parts of the various drawings. LTE is used throughout this disclosure as an example cellular system, but the ideas presented herein may apply to other wireless communication systems as well.

Figure 8:
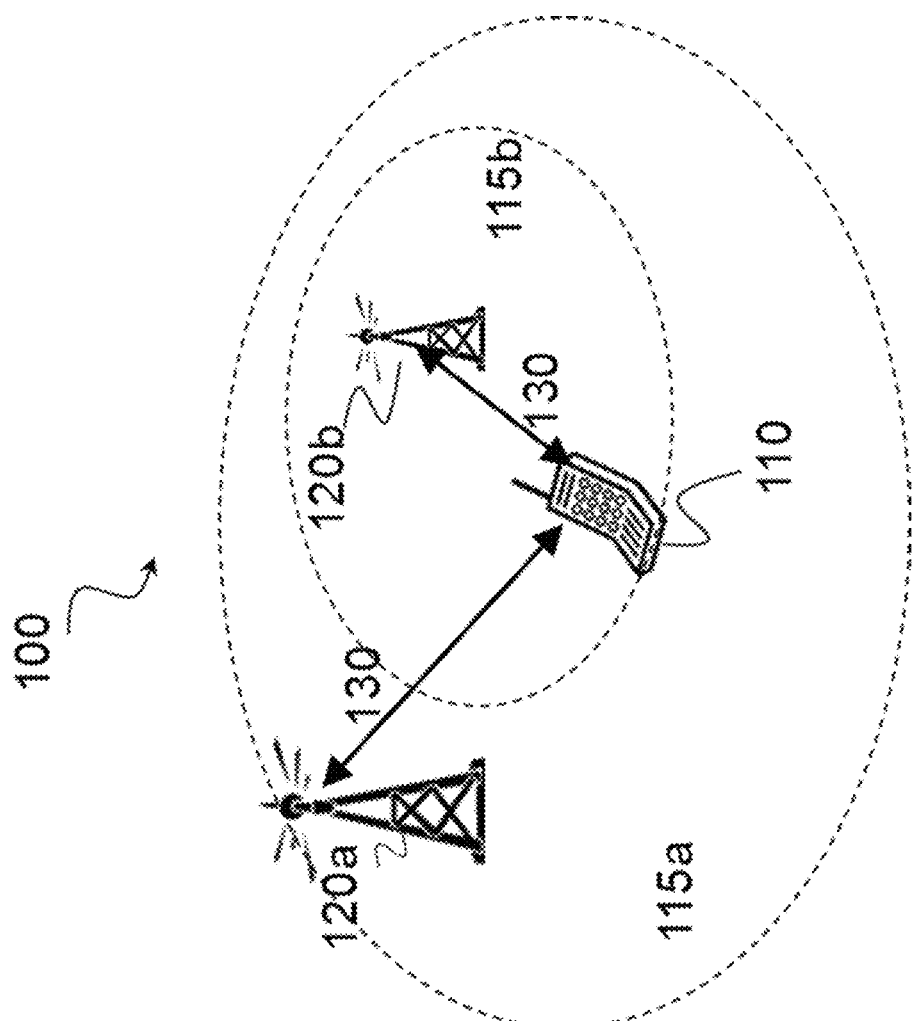
FIG. 8 is a block diagram illustrating an example wireless network, according to some embodiments.

FIG. 8 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Figure 2:
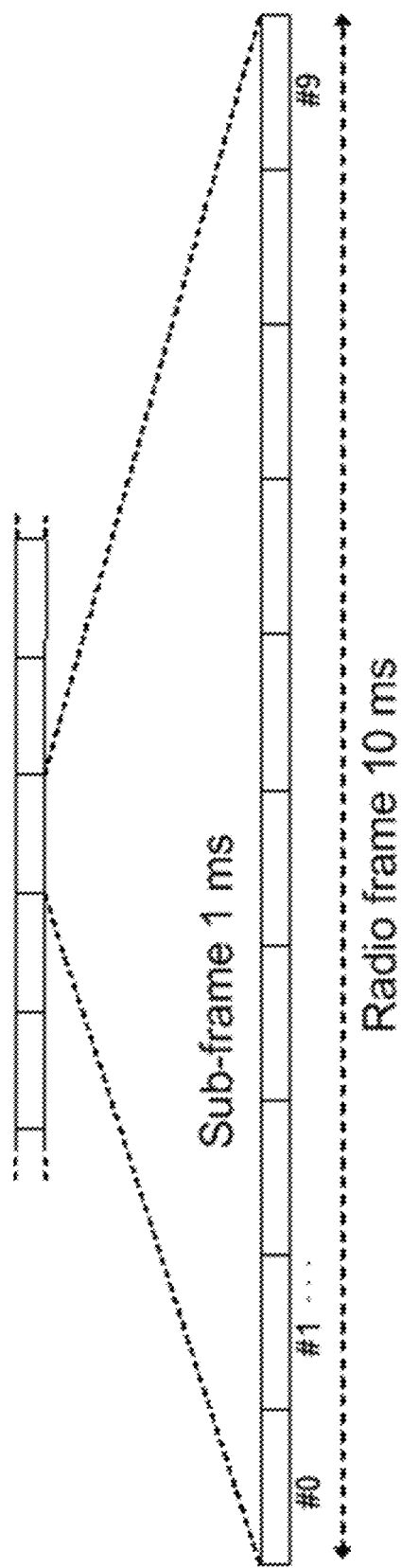
FIG. 2 illustrates an example radio frame.
Figure 3:
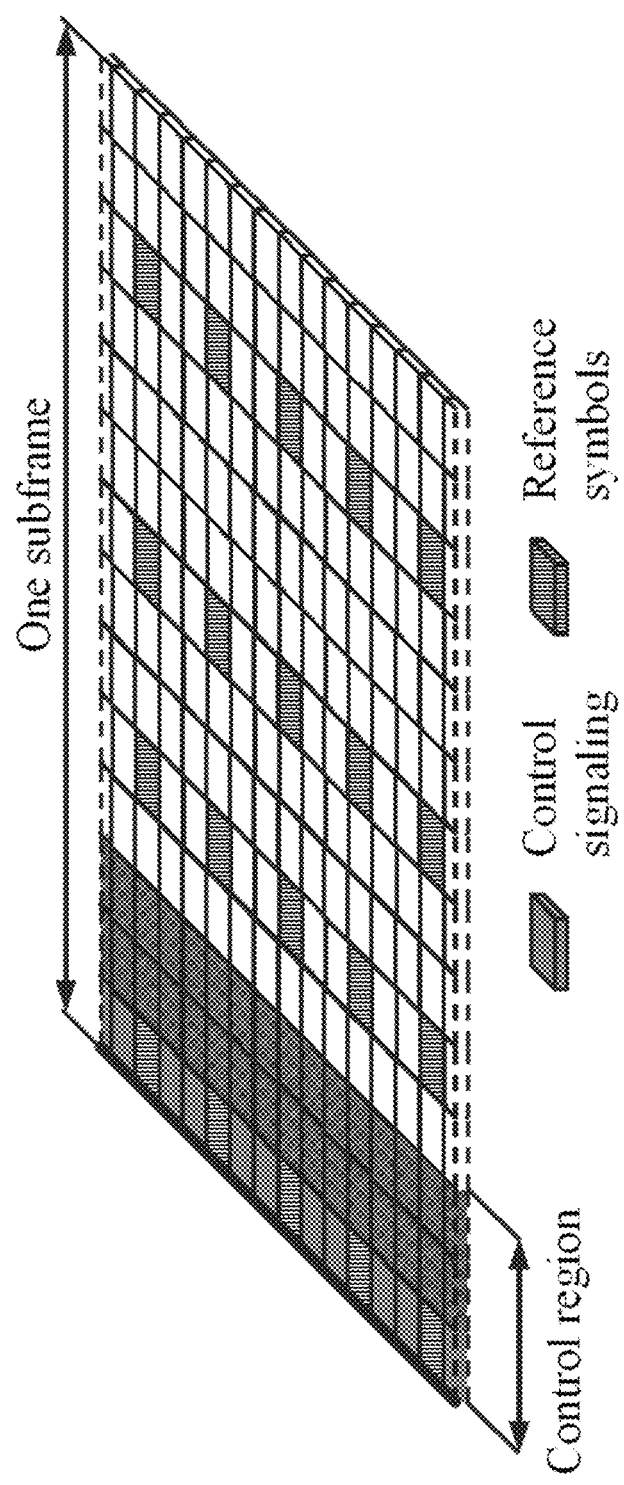
FIG. 3 illustrates an example downlink subframe.
Figure 4:
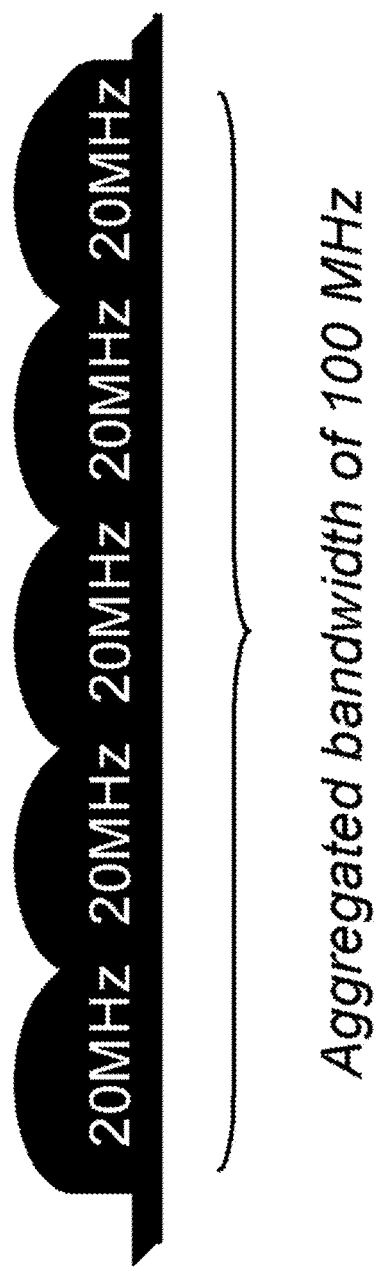
FIG. 4 illustrates an example of carrier aggregation.
Figure 5:
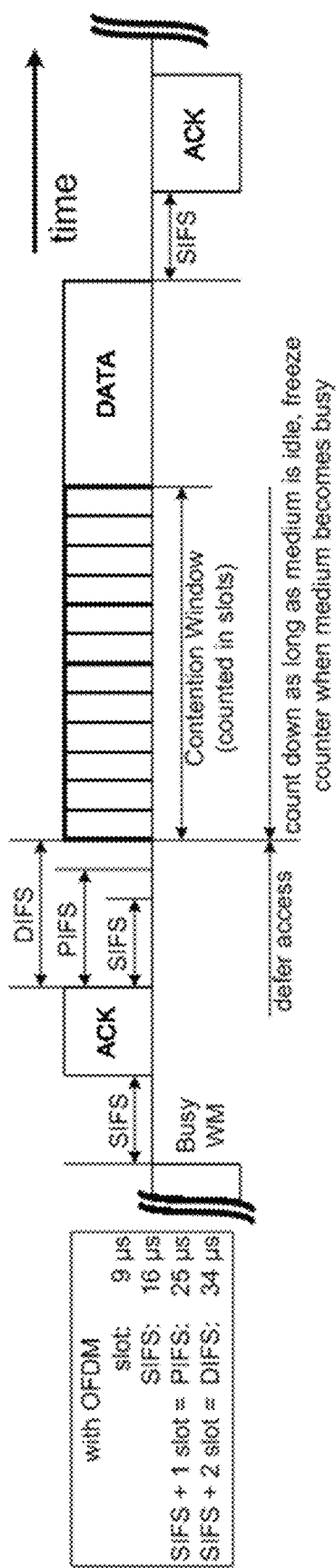
FIG. 5 illustrates an example WLAN listen-before-talk mechanism.
Figure 6:
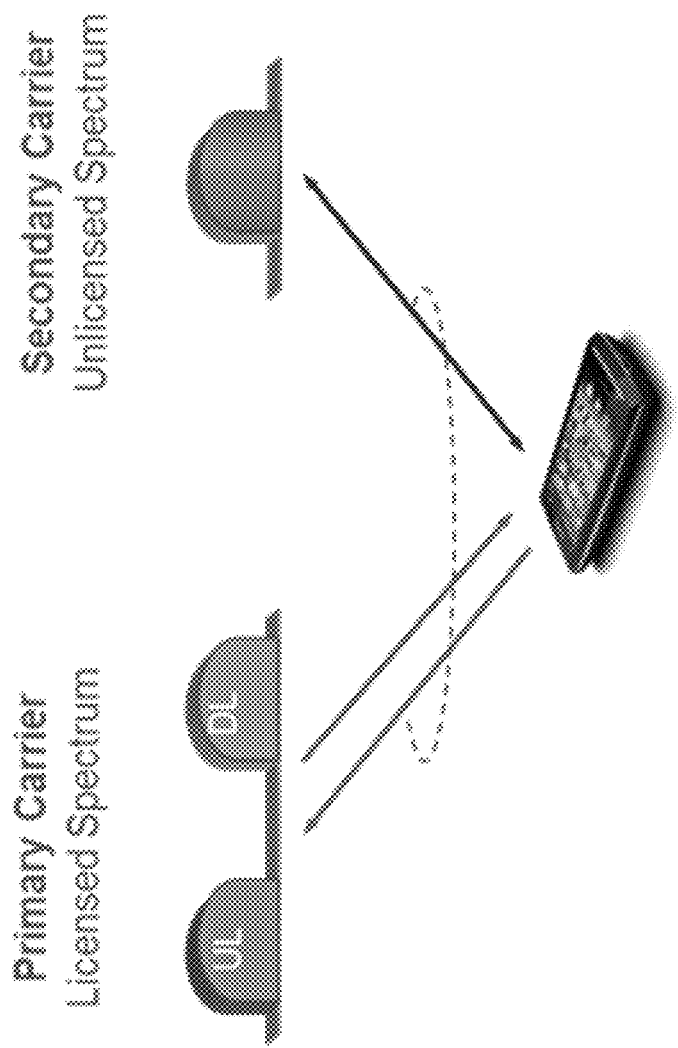
FIG. 6 illustrates a user equipment with license assisted access to unlicensed spectrum.
Figure 7:
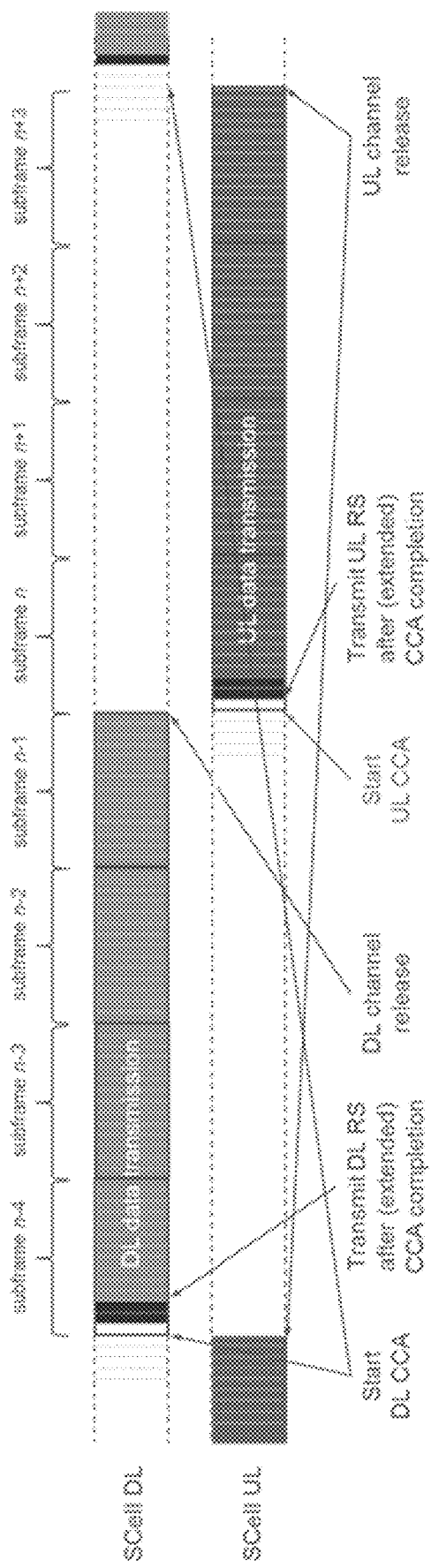
FIG. 7 illustrates an example of uplink license assisted access transmissions based on an uplink listen-before-talk protocol.

Wireless signals 130 may include frames and subframes, such as those described with respect to FIGS. 1-3. Network node 120 may dynamically schedule subframes as an uplink subframe, a downlink subframe, or a combination uplink and downlink subframe.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, network node 120a may dynamically schedule uplink and downlink subframes for wireless device 110. For example, in particular embodiments network node 120a may determine a first uplink/downlink scheduling pattern for a first plurality of consecutive subframes. Network node 120a may transmit the first uplink/downlink scheduling pattern to wireless device 110 (e.g., using (E)PDCCH) and transmit at least one subframe to wireless device 110 according to the first uplink/downlink scheduling pattern.

If network node 120a received additional downlink data, or a request for uplink transmission from a wireless device, for example, then network node 120a may determine a second uplink/downlink scheduling pattern for a second plurality of consecutive subframes. Network node 120a may transmit the second uplink/downlink scheduling pattern to wireless device 110 in any of the subframes previously scheduled for wireless device 110.

In particular embodiments, the uplink/downlink scheduling pattern may comprise a number of subsequent downlink subframes, a number of subsequent downlink and uplink subframes, an indication of which subframes to monitor or not monitor for downlink, or any other suitable pattern.

In particular embodiments, wireless device 110 may receive, from network node 120 (e.g., using (E)PDCCH), a first uplink/downlink scheduling pattern for a first plurality of consecutive subframes. Wireless device 110 may receive at least one subframe according to the first uplink/downlink scheduling pattern. In one of the scheduled downlink subframes, wireless device 110 may receive a second uplink/downlink scheduling pattern for a second plurality of consecutive subframes.

Wireless device 110 may perform LBT procedures before transmitting in the uplink. For example, wireless device 110 may transmit a first burst of uplink subframes after a first LBT procedure. Wireless device 110 determines a reference subframe based on the first burst of uplink subframes. The reference subframe is associated with a reference HARQ process identifier. Wireless device 110 receives scheduling for a second burst of uplink subframes. The scheduling comprises, for each subframe of the second burst of uplink subframes, an associated HARQ process identifier and an associated NDI. When wireless device 110 determines the HARQ process identifier associated with at least one of the subframes of the second burst of uplink subframes matches the reference HARQ process identifier and the associated NDI indicates new data, wireless device 110 resets the LBT contention window size to a minimum value. When wireless device 110 determines the HARQ process identifier associated with at least one of the subframes of the second burst of uplink subframes matches the reference HARQ process identifier and the associated NDI indicates a retransmission, Wireless device 110 increments the LBT contention window size. Wireless device 110 performs a second LBT procedure using the contention window size.

In particular embodiments, wireless device 110 may determine the reference subframe by determining a most recently transmitted uplink subframe in the first burst of uplink subframes for which the associated HARQ process identifier is also found in the received scheduling for the second burst of uplink subframes. In some embodiments, wireless device 110 may determine the reference subframe by determining the first transmitted subframe of the first burst of uplink subframes for which the HARQ process identifier associated with the first subframe of the first burst of uplink subframes is also found in the received scheduling for the second burst of uplink subframes.

In particular embodiments, performing the second LBT procedure comprises performing a Category 4 LBT for physical uplink shared channel (PUSCH) transmission on a licensed assisted access (LAA) secondary cell.

According to some embodiments, network node 120 may receive a first burst of uplink subframes from wireless device 110 after a first LBT procedure. Each subframe of the first burst of uplink subframes is associated with one or more transport blocks, and each transport block is associated with a HARQ process identifier. Network node 120 determines a set of transport blocks in the first burst of uplink subframes that were not received successfully. Before scheduling wireless device 110 with a second LBT procedure, network node 120 schedules wireless device 110 with a second burst of uplink frames using all the HARQ process identifiers associated with the transport blocks in the determined set of transport blocks.

In particular embodiments, network node 120 determines a reference subframe based on the last subframe before a received subframe in which at least one transport block was received successfully. The set of transport blocks includes the transport blocks in the reference subframe that were not received successfully.

Although particular embodiments are described with respect to licensed or unlicensed spectrum, license assisted access, and/or carrier aggregation, the embodiments described herein apply equally to uplink and downlink scheduling in any spectrum and with respect to a single cell or any combination of cells.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 15A below. Similarly, a network node may include any suitable combination of hardware and/or software. For example, in particular embodiments, a network node, such as network node 120, may include the components described with respect to FIG. 16A below.

Some embodiments include implicit signaling with contention window management at the UE. In general, the UE increases or resets the contention window size based on the most recent HARQ feedback information available for transport blocks that are transmitted at the beginning of an uplink burst of subframes from the UE. The UE knows whether the current grant is a transmission of a new transport block or a retransmission as indicated by the new data indicator (NDI) for transport blocks that are transmitted under a given HARQ process. The eNB may use some number of HARQ processes in parallel (e.g., 8 or 16). Certain UE procedures to achieve the use of transport blocks in the first subframe of a transmission burst in conjunction with implicit signaling from the eNB are disclosed herein.

In particular embodiments, a UE may use the following procedure to increase, or reset to the minimum value, the contention window size for performing LBT prior to transmission of an uplink burst for which the eNB has indicated that LBT using a Category 4 random backoff procedure (where contention window sizes can increase) should be performed. For example, the UE may use the most recently transmitted burst of contiguous subframes (excluding the currently scheduled burst) transmitted after a Category 4 LBT procedure for which the HARQ process number used in the first transmitted subframe of the burst also appears in a subsequently scheduled burst as the reference transmission burst. The HARQ process which satisfies the above condition is used as the reference HARQ process to determine the contention window size.

After transmission of the reference subframe and reception of a scheduling command for a subsequent burst that uses the reference HARQ process, if the NDI bit for the reference HARQ process is not toggled, indicating a retransmission, then the UE increases the contention window size to the next higher value in the set of contention window sizes for the priority class that was used to perform LBT prior to transmission of the reference transmission burst. In some embodiments, the contention window size of all the LBT priority classes used by the UE are increased to the next higher value.

If the NDI bit for the reference HARQ process is toggled, indicating the transmission of a new transport block, the UE resets the contention window size to the minimum value in the set of contention window sizes for the priority class that is being used by the UE to perform a Category 4 LBT procedure prior to transmission of the next transmission burst. The priority class may either be chosen by the UE based on the traffic type it intends to transmit or may be indicated by the eNB in the uplink grants for the next transmission burst. In some embodiments, the contention window size of all the LBT priority classes used by the UE are reset to the minimum value.

Particular embodiments includes procedures performed by an eNB. In some embodiments, after reception of an uplink transmission burst transmitted by a UE after a category 4 LBT procedure, the eNB schedules data to the UE at or before the time a new transmission burst is scheduled on the uplink using a Category 4 procedure using all HARQ process identifiers in the received uplink transmission burst for which the corresponding transport block was not successfully received.

The HARQ process identifiers indicating retransmission need not have been scheduled via uplink grant for a Category 4 LBT based uplink transmission with random backoff. The processes may have been scheduled via uplink grant for a short LBT (e.g., CCA of 25 us) or no LBT.

In examples described above, the contention window size is increased to the next higher value only if the NDI bit for the reference HARQ process is not toggled and the device actually transmitted the reference HARQ process as the first subframe of the prior transmission burst. This is because two types of reasons may cause a HARQ process retransmission.

One reason is that the HARQ process was transmitted but collision a happened. For these cases, a retransmission should use a larger contention window size. Another reason is that the device was not able to transmit the HARQ process in the prior scheduled transmission burst based on the LBT protocol. That is, the device observed occupied channel condition and refrained from transmission to avoid collision. For these cases, the contention window size should not be increased.

More detailed examples are described with respect to FIGS. 9-12. FIGS. 9-12 illustrate example sequences of subframes for implicitly determining an LBT contention window size, according to some embodiments.

Figure 9:
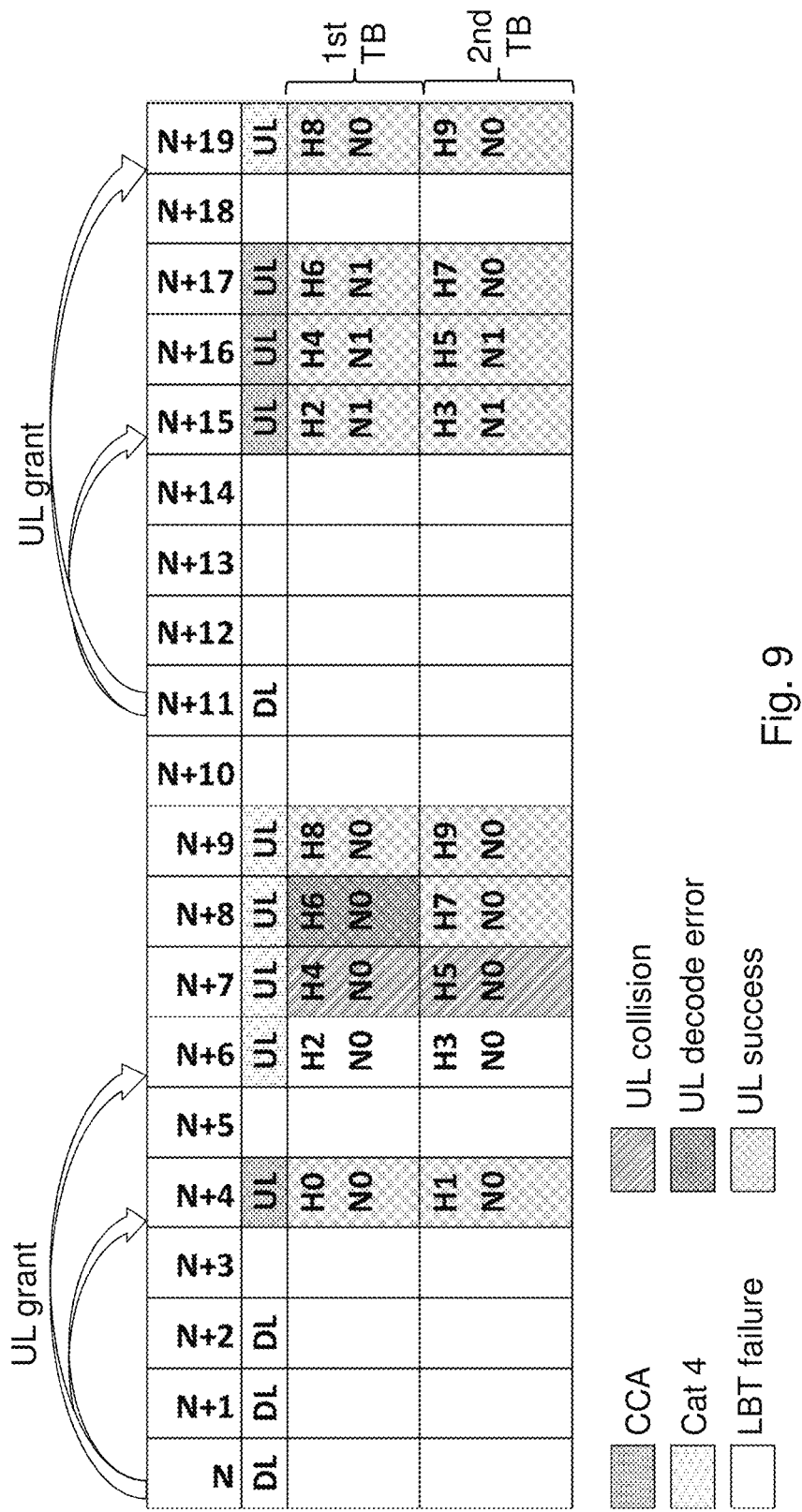
FIGS. 9-12 illustrate example sequences of subframes for implicitly determining an LBT contention window size, according to some embodiments.

FIG. 9 illustrates a first example sequence of subframes for implicitly determining an LBT contention window size, according to some embodiments. The illustrated example includes subframes numbered N to N+19. Subframes N, N+1, N+2, and N+11 are downlink subframes. Subframes N+4, N+6, N+7, N+8, N+9, N+15, N+16, N+17, and N+19 are uplink subframes.

The uplink subframes are scheduled by grants received in the downlink subframes. In the illustrated example, the arrows indicate the downlink and uplink subframes where grants are transmitted in the downlink subframes to schedule uplink data in the uplink subframes. For example, downlink subframe N includes scheduling grants for uplink subframes N+4, N+6, N+7, N+8, and N+9. Downlink subframe N+11 includes scheduling grants for uplink subframes N+15, N+16, N+17, and N+19.

The scheduling grant may indicate whether the uplink should be performed after a Category 4 LBT procedure or a 25 us CCA. For example, uplink subframes N+4, N+15, N+16, and N=17 are scheduled for CCA. Uplink subframes N+6, N+7, N+8, N+9, and N+19 are scheduled for Category 4 LBT.

In the illustrated example, each subframe includes two transport blocks, and each transport block is associated with a HARQ process (indicated by HARQ process identifiers H0, H1, H2, etc.). Other embodiments may include any suitable number of transport blocks and HARQ processes.

The scheduling information also includes a new data indicator (NDI) that is represented by the tags N0 or N1. The tag N0 indicates that the new data indicator is toggled, which indicates to the UE that the grant is for a new data transport block. Similarly, N1 indicates that the new data indicator is not-toggled, which means that the grant is for a retransmission of a transport block that was incorrectly received.

As indicated by the legend in FIG. 9, some uplink subframes may experience LBT failure (e.g., subframe N+6), a collision (e.g., subframe N+7), or a decoding error (e.g., subframe N+8). Note that a decoding error may apply to one or both of the two transport blocks for each subframe. The UE may use the HARQ process identifiers to determine a reference subframe and the NDI to determine whether to increment or reset an LBT contention window size.

As a specific example with respect to FIG. 9, the uplink grants in subframe N schedules the UE with PUSCH transmission in subframe N+4 based on 25 us CCA and PUSCH transmission in subframes N+6 to N+9 based on Category 4 LBT. The UE succeeds with CCA at subframe N+4. The UE, however, fails with Category 4 LBT at subframe N+6, but succeeds with Category 4 LBT at subframe N+7 and continues transmission until subframe N+9.

The reference subframe for the UE is thus subframe N+7 (i.e., first transmitted uplink after a Category 4 LBT procedure) and the corresponding HARQ process identifiers are H4 and H5. The first transmitted subframe (N+7) happens to be heavily interfered with in the example. At the eNB, transport blocks corresponding to H2, H3, H4, and H5 are not detected and the transport block corresponding to H6 is detected in error. The eNB schedules all these HARQ processes (i.e., H2, H3, H4, H5 and H6) with non-toggled NDI before granting the UE with another Category 4 LBT.

For contention window adjustment, the UE looks only for NDI of H4 and H5 (i.e., the reference subframe) and finds that they are non-toggled. Thus, the UE increases the contention window for the next Category 4 LBT transmission. In the illustrated example, the UE is scheduled for Category 4 LBT at subframe N+19. The UE increases the contention window size before performing the Category 4 LBT at subframe N+19.

Figure 10:
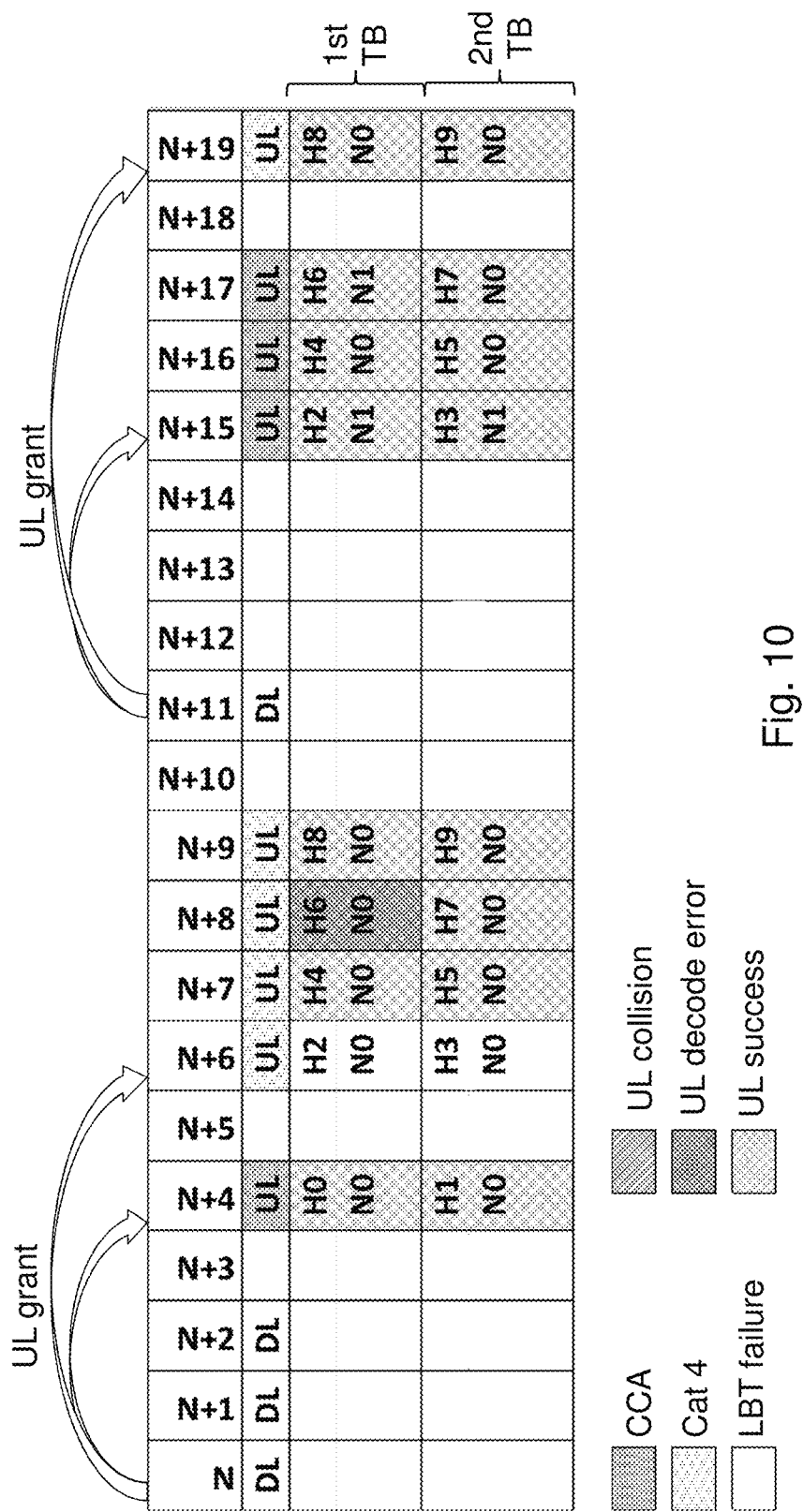

FIG. 10 illustrates another example sequence of subframes for implicitly determining an LBT contention window size, according to some embodiments. The illustrated example includes subframes numbered N to N+19 similar to those described with respect to FIG. 9. A difference is that the uplink transmission at subframe N+7 is successful in FIG. 10 (i.e., no collision as in FIG. 9).

The uplink grants in subframe N schedules the UE with PUSCH transmission in subframe N+4 based on 25 us CCA and PUSCH transmission in subframes N+6 to N+9 based on Category 4 LBT. The UE succeeds with CCA LBT at subframe N+4. The UE, however, fails with Category 4 LBT at subframe N+6, but the UE succeeds with Category 4 LBT at subframe N+7 and continues transmission until subframe N+9. Similar to the example in FIG. 9, the reference subframe for the UE is subframe N+7 and the corresponding HARQ process identifiers are H4 and H5. In the example illustrated in FIG. 10, the UE transmission after successful LBT is detected correctly at the eNB (i.e., H4 and H5 are decoded successfully).

At the eNB, transport blocks corresponding to H2 and H3 are not detected and the transport block corresponding to H6 is detected in error. The eNB schedules all these HARQ processes (i.e., H2, H3, and H6) with non-toggled NDI before granting the UE with another Category 4 LBT.

For contention window adjustment, the UE looks only for NDI of H4 and H5 and finds that they are toggled (it could also be the case that UE wouldn't find them). Thus, the UE resets the contention window size for the next Category 4 LBT transmission. In the illustrated example, the UE is scheduled for Category 4 LBT at subframe N+19. The UE resets the contention window size to its minimum value before performing the Category 4 LBT at subframe N+19.

As described with respect to FIGS. 9 and 10, the eNB signals the HARQ processes with not-toggled NDI for all the failed transmissions in the reference transmission burst. However, not all of the not-toggled NDI contribute to the decision for contention window adjustment. Only the not-toggled NDI corresponding to the beginning of the transmission burst contribute. This may simplify scheduling constraints on the eNB by enabling the eNB to only provide the relevant information for contention window adjustment. In particular embodiments, the following procedure is used by the UE to increase or reset to the minimum value the contention window size for performing LBT prior to transmission of an uplink burst for which the eNB has indicated that LBT using a Category 4 random backoff procedure (where contention window sizes can increase) must be performed.

The most recently transmitted burst of contiguous subframes that are transmitted after performing a category 4 LBT procedure and which ended more than X ms prior to the current time is defined as the reference transmission burst. The value of X may be chosen such that enough time is available for providing feedback for a transmission by the UE. For example, X=4 ms is recommended for LTE and LAA as long as the HARQ feedback delay is at least 4 ms.

The first subframe in the reference transmission burst for which a HARQ process identifier in that subframe has been reused for a subsequently scheduled transmission burst is defined as the reference subframe. After transmission of the reference subframe, if the NDI bit for all the HARQ process identifiers in the reference subframe are not-toggled (i.e., indicating that they are retransmissions), the contention window size is increased to the next higher value in the set of contention window sizes for the priority class that was used to perform LBT prior to transmission of the reference transmission burst. Alternatively, the contention window size of all the LBT priority classes used by UE may be increased to the next higher value.

Otherwise, if the NDI bit for at least one of the reference HARQ process identifiers is toggled (i.e., indicating that the grant is for the transmission of a new transport block or there is no HARQ process identifier of the reference subframe), the contention window size is reset to the minimum value in the set of contention window sizes for the priority class that is being used by the UE to perform LBT prior to transmission of the transmission burst. This priority class may either be chosen by the UE based on the traffic type it intends to transmit or may be indicated by the eNB in the uplink grants for the current transmission burst. Alternatively, the contention window size of all the LBT priority classes used by the UE may be reset to the minimum value.

Particular embodiments may include the following procedure used by the eNB. In a transmission burst received on the uplink that was scheduled to be transmitted after a category 4 LBT procedure by a UE, the last subframe before a subframe in which at least one transport block was successfully received is defined as the reference subframe. If no transport blocks in the burst were successfully received, then the last subframe in the burst is the reference subframe. If at least one transport block was received successfully in each of the subframes in the burst, then there is no reference subframe defined for the transmission burst.

If a reference subframe is defined for the transmission burst, the eNB schedules data to the UE using all HARQ process identifiers in the reference subframe with non-toggled corresponding NDI at or before the time a new transmission burst is scheduled on the uplink using a Category 4 procedure.

The HARQ process identifiers indicating retransmission need not have been scheduled via uplink grant for a Category 4 LBT based uplink transmission with random back-off. It could also have been scheduled via uplink grant for a short LBT (e.g., CCA of 25 us) or no LBT.

In the examples described above, the contention window size is increased to the next higher value only if the NDI bit for the reference HARQ process is not-toggled and the device actually transmitted the reference HARQ process as the first subframe of the prior transmission burst. This is because two types of reasons may cause a HARQ process retransmission.

One reason is that the HARQ process was transmitted but collision a happened. For these cases, a retransmission should use a larger contention window size. Another reason is that the device was not able to transmit the HARQ process in the prior scheduled transmission burst based on the LBT protocol. That is, the device observed occupied channel condition and refrained from transmission to avoid collision. For these cases, the contention window size should not be increased.

Figure 11:
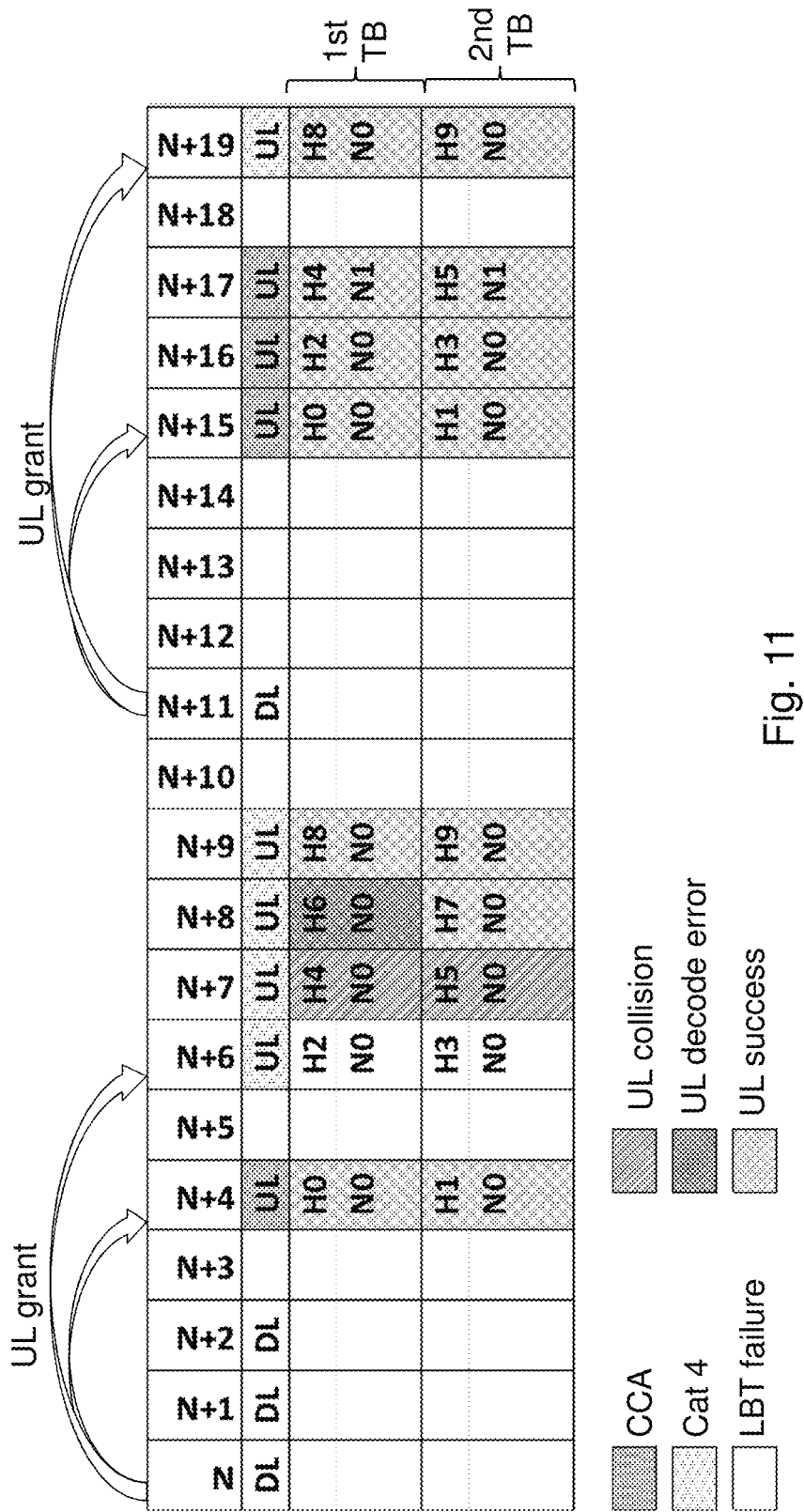
Figure 12:
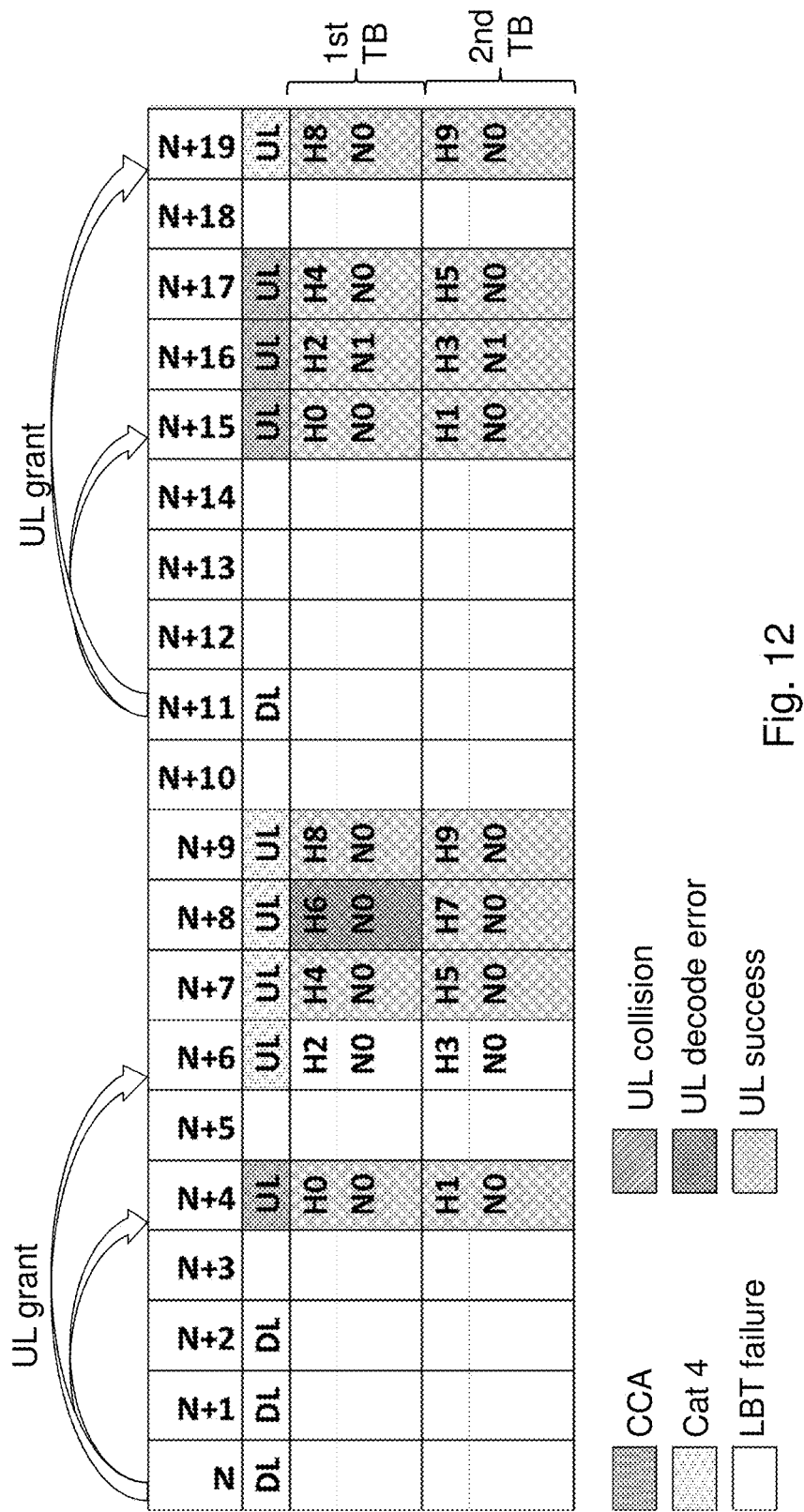

Two examples of the previous embodiments are illustrated in FIGS. 11 and 12. From these two examples, the difference between the embodiments described with respect to FIGS. 9 and 10 may be better understood FIG. 11 illustrates another example sequence of subframes for implicitly determining an LBT contention window size, according to some embodiments. The illustrated example includes subframes numbered N to N+19 similar to those described with respect to FIG. 9.

The reference subframe at the UE is subframe N+7. The eNB, however, detects that both transport blocks are detected in error in subframe N+6 and N+7, while in subframe N+8, only one of the transport blocks is in error. Thus, the reference subframe at the eNB is subframe N+7. Therefore, the eNB only schedules H4 and H5 with non-toggled NDI. The reference subframe at the UE is also subframe N+7 and the UE, for contention window adjustment, looks for HARQ processes H4 and H5.

FIG. 12 illustrates another example sequence of subframes for implicitly determining an LBT contention window size, according to some embodiments. The illustrated example includes subframes numbered N to N+19 similar to those described with respect to FIG. 10.

The reference subframe at the UE is subframe N+7. The eNB, however, detects that both transport blocks are detected in error in subframe N+6, while both transport blocks are detected correctly in subframe N+7. Thus, from the eNB perspective, reference subframe is N+6. Accordingly, the eNB schedules H2 and H3 with non-toggled eNB.

On the other hand, the UE looks for HARQ processes H4 and H5 in its reference subframe 7 to check if they have been scheduled and if so whether they are non-toggled or toggled (it could be that they were not scheduled at all). Because processes H4 and H5 are toggled, the UE resets the contention window size to minimum for the Category 4 LBT attempt which is scheduled in subframe N+19.

Some embodiments include a correction mechanism for contention window management. For example, some methods adjust the contention window size by signaling the position of a reference burst or subframe as detected at the eNB to the UE such that the UE can use this information to compare with its actual transmission to adjust the contention window size. In these methods, however, the reference subframes may be signaled multiple times before the first signaled parameter has been processed. This may happen because of processing delays (e.g., the delay of 4 ms between the time a UE receives a scheduling command and the time it transmits on the uplink). Such delays can lead to the contention window size being adjusted multiple times incorrectly. This problem can also be caused, for example, if the UE misses an uplink grant.

To address these problems, particular embodiments may include one or both of the following solutions. The reference subframe may be restricted to be signaled only once (i.e., not multiple times). In another solution, the reference subframe is used only once by the UE for contention window size adjustment and is ignored if it is received more than once.

Figure 13:
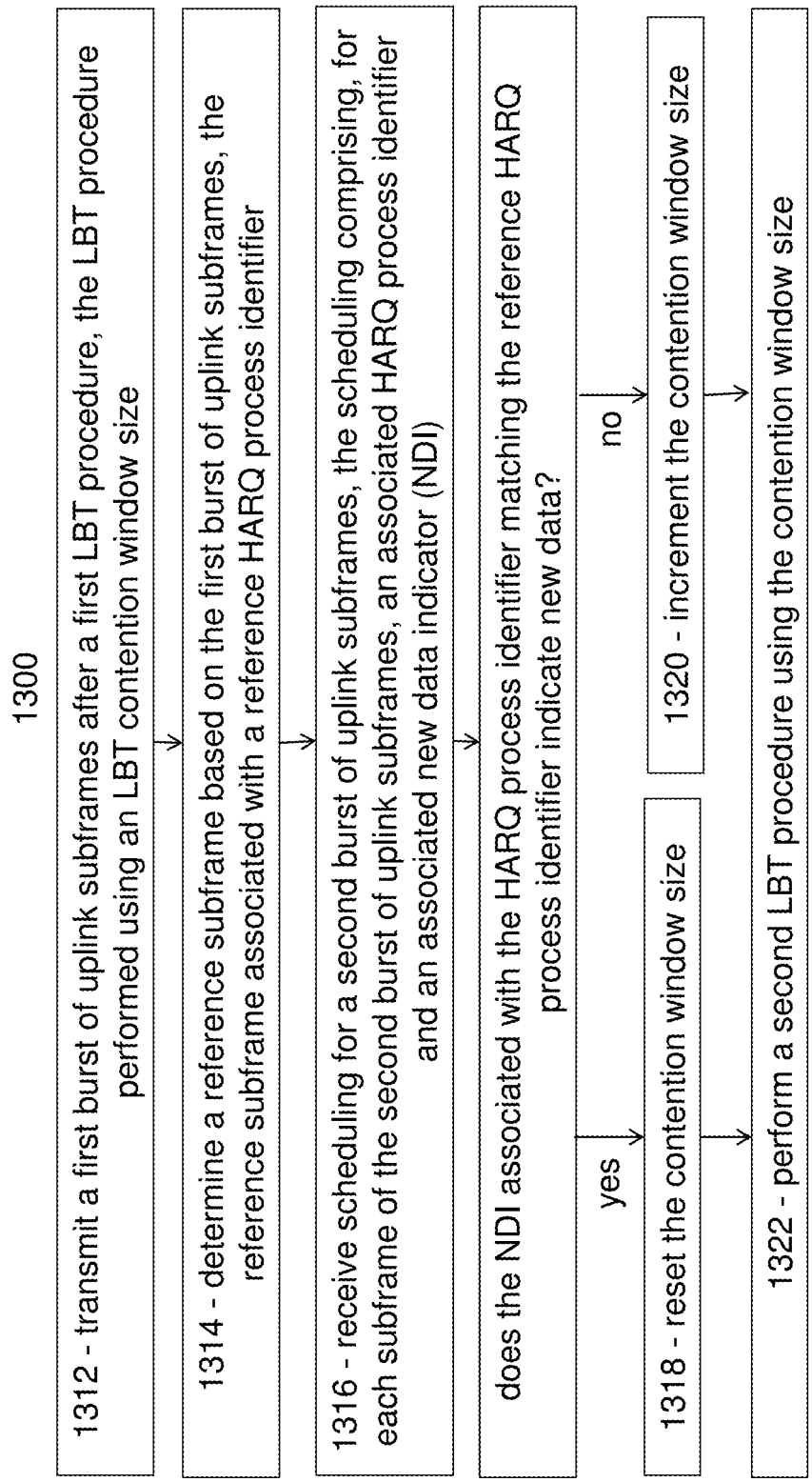
FIG. 13 is a flow diagram illustrating an example method in a user equipment, according to some embodiments.
Figure 14:
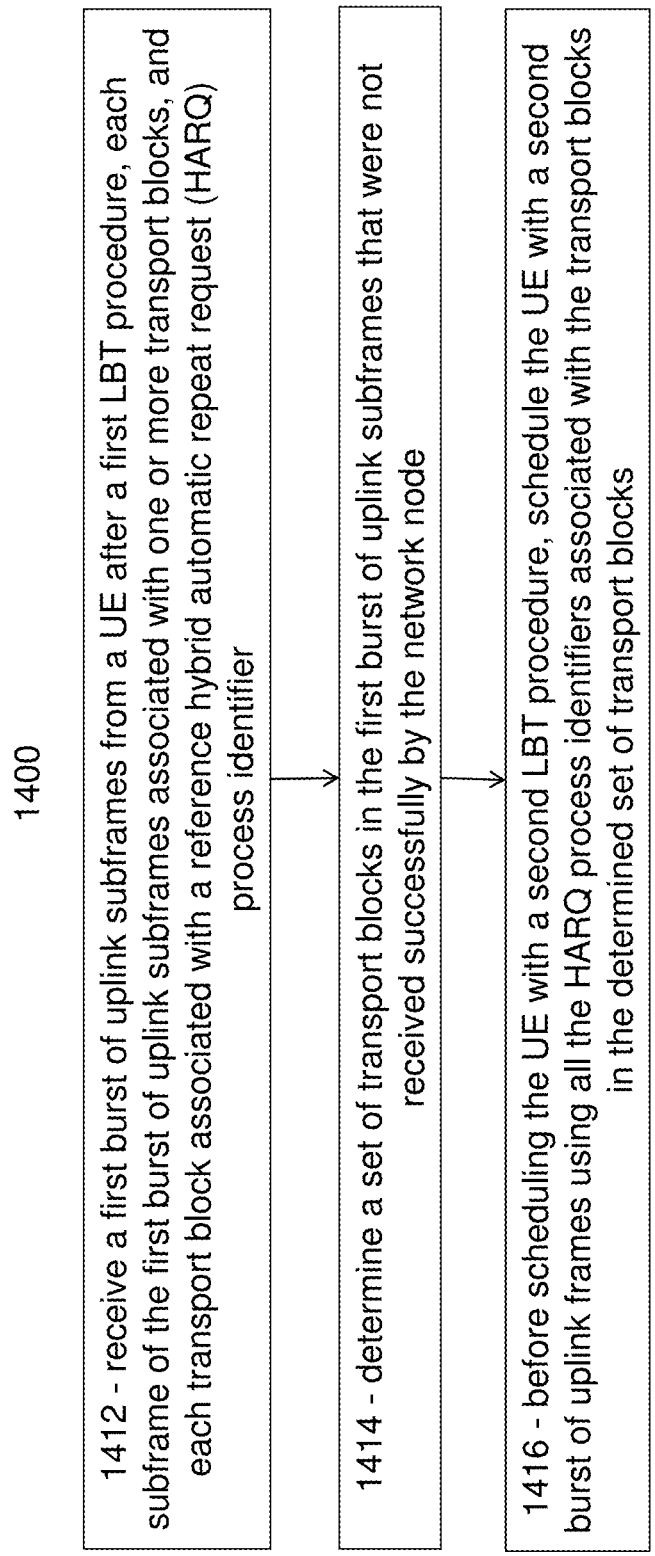
FIG. 14 is a flow diagram illustrating an example method in a network node, according to some embodiments.

General examples of the methods described above with respect to FIGS. 9-10 are illustrated in FIG. 13 with respect to the UE, and FIG. 14 with respect to the network node.

FIG. 13 is a flow diagram illustrating an example method in a user equipment, according to some embodiments. In particular embodiments, one or more steps of FIG. 13 may be performed by components of wireless network 100 described with respect to FIG. 8.

The method begins at step 1312, where the UE transmits a first burst of uplink subframes after a first LBT procedure. The LBT procedure is performed using an LBT contention window size. For example, wireless device 110 may receive burst of subframes N+6 to N+9 illustrated in any of FIGS. 9-12.

At step 1314, the UE determines a reference subframe based on the first burst of uplink subframes, the reference subframe associated with a reference HARQ process identifier. In some embodiments, determining the reference subframe comprises determining a most recently transmitted uplink subframe in the first burst of uplink subframes for which the associated HARQ process identifier is also found in the received scheduling for the second burst of uplink subframes. In some embodiments, determining the reference subframe comprises determining the first transmitted subframe of the first burst of uplink subframes for which the HARQ process identifier associated with the first subframe of the first burst of uplink subframes is also found in the received scheduling for the second burst of uplink subframes.

For example, referring to the examples illustrated in FIGS. 9-12, wireless device 110 may determine subframe N+7 is the first transmitted subframe of the first burst of uplink subframes. Subframe N+6 was not transmitted because of LBT failure, thus N+7 is the first transmitted subframe.

In some examples (e.g., FIGS. 9 and 11), subframe N+7 suffered from a collision error. In other examples (e.g., FIGS. 10 and 12), subframe N+7 is received successfully by network node 120. Either way, subframe N+7 is the first transmitted subframe (whether successfully received or not), and is therefore determined to be the reference subframe.

At step 1316, the UE receives scheduling for a second burst of uplink subframes. The scheduling comprises, for each subframe of the second burst of uplink subframes, an associated HARQ process identifier and an associated new data indicator (NDI). For example, wireless device 110 may receive scheduling in downlink subframe N+11 for a second burst of subframes N+15 to N+17 illustrated in any of FIGS. 9-12. With respect to FIG. 9, subframe N+15 is associated with HARQ identifiers H2 and H3. The NDI for both H2 and H3 are toggled indicating a retransmission because the previously scheduled transmission for H2 and H3 (i.e., subframe N+6) was not transmitted because of LBT failure. Subframe N+16 is associated with HARQ identifiers H4 and H5. The NDI for both H4 and H5 are toggled indicating a retransmission because the previously transmitted subframe for H4 and H5 (e.g., subframe N+7) failed because of a collision error. Subframe N+17 is associated with HARQ identifiers H6 and H7. The NDI for H6 is toggled indicating a retransmission because the previously transmitted transport block for H6 (e.g., subframe N+8) failed because of a decoding error at network node 120. The NDI for H7 is not-toggled indicating a new transmission because the previously transmitted transport block for H7 (e.g., subframe N+8) was decoded successfully at network node 120.

When the UE determines the HARQ process identifier associated with at least one of the subframes of the second burst of uplink subframes matches the reference HARQ process identifier and the associated NDI indicates new data, the method continues to step 1318 where the UE resets the LBT contention window size to a minimum value. For example, regarding FIG. 10, wireless device 110 determined subframe N+7 is the reference subframe at previous step 1314. Subframe N+7 is associated with HARQ identifiers H4 and H5, which were successfully received by network node 120. Thus, the NDI associated with HARQ identifiers H4 and H5 scheduled for subframe N+16 indicate a new transmission. Based on the indication of a new transmission, wireless device 110 resets the Category 4 LBT contention window size to a minimum or initial value.

When the UE determines the HARQ process identifier associated with at least one of the subframes of the second burst of uplink subframes matches the reference HARQ process identifier and the associated NDI indicates retransmission, the method continues to step 1320 where the UE resets the LBT contention window size to a minimum value.

For example, regarding FIG. 9, wireless device 110 determined subframe N+7 is the reference subframe at previous step 1314. Subframe N+7 is associated with HARQ identifiers H4 and H5, which were not successfully received by network node 120. Thus, the NDI associated with HARQ identifiers H4 and H5 scheduled for subframe N+16 indicate a retransmission. Based on the indication of a retransmission, wireless device 110 increments the Category 4 LBT contention window size.

In particular embodiments, resetting the LBT contention window size to a minimum value comprises resetting the LBT contention window size to a minimum value of a set of values associated with a priority class used by the UE to perform the first LBT procedure. For example, wireless device 110 may have used a particular priority class for the Category 4 LBT procedure at subframe N+7. Wireless device 110 may reset the contention window size for that particular priority class. In some embodiments, resetting the LBT contention window size to a minimum value may comprise resetting LBT contention window sizes associated with all priority classes used by the UE.

At step 1322, the UE performs a second LBT procedure using the contention window size. For example, wireless device 110 may use the contention window size modified at one of steps 1318 or 1320 to perform a Category 4 LBT procedure for subframe N+19 in any of FIGS. 9-12.

Modifications, additions, or omissions may be made to method 1300. Additionally, one or more steps in method 1300 of FIG. 13 may be performed in parallel or in any suitable order. The steps of method 1300 may be repeated over time as necessary.

FIG. 14 is a flow diagram illustrating an example method in a network node, according to some embodiments. In particular embodiments, one or more steps of FIG. 14 may be performed by components of wireless network 100 described with respect to FIG. 8.

The method begins at step 1412, where a network node receives a first burst of uplink subframes from a wireless device after a first LBT procedure. Each subframe of the first burst of uplink subframes is associated with one or more transport blocks, and each transport block is associated with a reference HARQ process identifier. For example, with respect to FIG. 9, network node 120 scheduled wireless device 110 to transmit uplink subframes N+6, N+7, N+8, and N+9 after a Category 4 LBT procedure. Network node 120 receives burst of uplink subframes N+8 and N+9 (N+6 was not received because it was never transmitted by wireless device 110, and N+7 was not received because of a collision error).

At step 1414, the network node determines a set of transport blocks in the first burst of uplink subframes that were not received successfully by the network node. For example, with respect to FIG. 9, network node 120 determines that scheduled subframes N+6 (with transport blocks associated with HARQ process identifiers H2 and H3) and N+7 (with transport blocks associated with HARQ process identifiers H4 and H5) were never received. Network node 120 also determines that the transport block associated with HARQ identifier H6 in subframe N+8 was not decoded successfully. Thus, the set of transport blocks in the first burst of uplink subframes include the transport blocks associated with HARQ identifiers H2, H3, H4, H5 and H6.

At step 1416, the network node schedules the UE with a second burst of uplink frames using all the HARQ process identifiers associated with the transport blocks in the determined set of transport blocks before scheduling the UE with a second LBT procedure. For example, with respect to FIG.

9, network node 120 schedules wireless device 110 for uplink at subframe N+15 for HARQ processes identifiers H2 and H3, at subframe N+16 for HARQ processes identifiers H2 and H3, and at subframe N+17 for HARQ process identifier H6. Then network node 120 schedules the next Category 4 LBT procedure for subframe N+19.

In some embodiments, determining the set of transport blocks in the first burst of uplink subframes that were not received successfully at previous step 1414 comprises determining a reference subframe based on the last subframe before a received subframe in which at least one transport block was received successfully. The set of transport blocks includes the transport blocks in the reference subframe that were not received successfully. For example, with respect to FIG. 12, network node 120 may determine subframe N+6 is the reference subframe. N+6 is the reference subframe because out of the burst of uplink subframes N+6 to N+9, subframe N+7 is the first subframe in in which at least one transport block was received successfully. The last subframe before N+7 is N+6, thus N+6 is the reference subframe and the set of transport blocks includes the transport blocks associated with HARQ process identifiers H2 and H3.

In this example with respect to FIG. 12, at step 1416 network node 120 schedules wireless device 110 for uplink at subframe N+16 for HARQ processes identifiers H2 and H3. Then network node 120 schedules the next Category 4 LBT procedure for subframe N+19.

Modifications, additions, or omissions may be made to method 1400. Additionally, one or more steps in method 1400 of FIG. 14 may be performed in parallel or in any suitable order. The steps of method 1400 may be repeated over time as necessary.

Figure 15B:
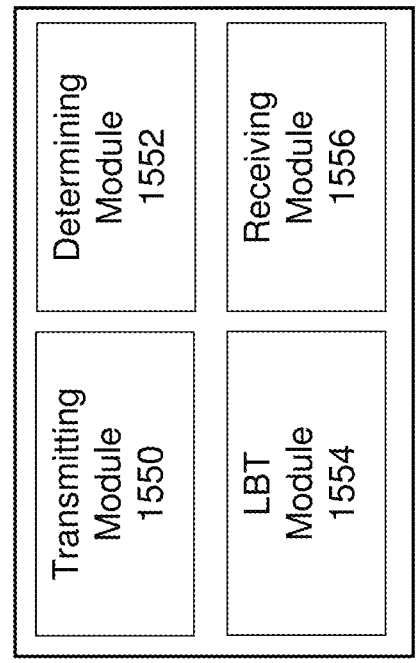
FIG. 15B is a block diagram illustrating example components of a wireless device.
Figure 15A:
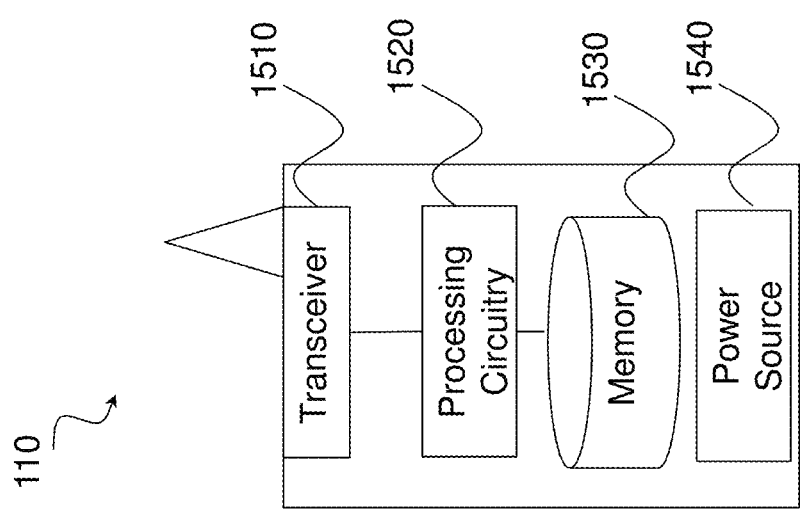
FIG. 15A is a block diagram illustrating an example embodiment of a wireless device.

FIG. 15A is a block diagram illustrating an example embodiment of a wireless device. The wireless device is an example of the wireless devices 110 illustrated in FIG. 8. In particular embodiments, the wireless device is capable of performing LBT procedures before transmitting in the uplink.

For example, the wireless device is operable to transmit a first burst of uplink subframes after a first LBT procedure. The LBT procedure is performed using an LBT contention window size. The wireless device determines a reference subframe based on the first burst of uplink subframes. The reference subframe is associated with a reference HARQ process identifier. The wireless device receives scheduling for a second burst of uplink subframes. The scheduling comprises, for each subframe of the second burst of uplink subframes, an associated HARQ process identifier and an associated NDI.

When the wireless device determines the HARQ process identifier associated with at least one of the subframes of the second burst of uplink subframes matches the reference HARQ process identifier and the associated NDI indicates new data, the wireless device resets the LBT contention window size to a minimum value. When the wireless device determines the HARQ process identifier associated with at least one of the subframes of the second burst of uplink subframes matches the reference HARQ process identifier and the associated NDI indicates a retransmission, the wireless device increments the LBT contention window size. The wireless device performs a second LBT procedure using the contention window size.

In particular embodiments, the wireless device determines the reference subframe by determining a most recently transmitted uplink subframe in the first burst of uplink subframes for which the associated HARQ process identifier is also found in the received scheduling for the second burst of uplink subframes. In some embodiments, the wireless device determines the reference subframe by determining the first transmitted subframe of the first burst of uplink subframes for which the HARQ process identifier associated with the first subframe of the first burst of uplink subframes is also found in the received scheduling for the second burst of uplink subframes.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1510, processing circuitry 1520, memory 1530, and power source 1540. In some embodiments, transceiver 1510 facilitates transmitting wireless signals to and receiving wireless signals from wireless network node 120 (e.g., via an antenna), processing circuitry 1520 executes instructions to provide some or all of the functionality described herein as provided by the wireless device, and memory 1530 stores the instructions executed by processing circuitry 1520. Power source 1540 supplies electrical power to one or more of the components of wireless device 110, such as transceiver 1510, processing circuitry 1520, and/or memory 1530.

Processing circuitry 1520 includes any suitable combination of hardware and software implemented in one or more integrated circuits or modules to execute instructions and manipulate data to perform some or all of the described functions of the wireless device. In some embodiments, processing circuitry 1520 may include, for example, one or more computers, one more programmable logic devices, one or more central processing units (CPUs), one or more microprocessors, one or more applications, and/or other logic, and/or any suitable combination of the preceding. Processing circuitry 1520 may include analog and/or digital circuitry configured to perform some or all of the described functions of wireless device 110. For example, processing circuitry 1520 may include resistors, capacitors, inductors, transistors, diodes, and/or any other suitable circuit components.

Memory 1530 is generally operable to store computer executable code and data. Examples of memory 1530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1540 is generally operable to supply electrical power to the components of wireless device 110. Power source 1540 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1520 in communication with transceiver 1510 performs LBT procedures before transmitting in the uplink. For example, processing circuitry 1520 in communication with transceiver 1510 receives scheduling for a current burst of contiguous uplink subframes, determine a reference subframe based on a previously-scheduled burst of contiguous uplink subframes, and adjusts an LBT contention window based on the reference subframe.

Other embodiments of the wireless device may include additional components (beyond those shown in FIG. 15A) responsible for providing certain aspects of the wireless device's functionality, including any of the functionality described above and/or any additional functionality (including any functionality necessary to support the solution described above).

FIG. 15B is a block diagram illustrating example components of a wireless device 110. The components may include transmitting module 1550, determining module 1552, LBT module 1554, and receiving module 1556.

Transmitting module 1550 may perform the transmitting functions of wireless device 110. For example, transmitting module 1550 may transmit a first burst of uplink subframes after a first LBT procedure. Transmitting module 1550 may perform the transmitting functions described in any of the examples above, including FIGS. 9-14. In certain embodiments, transmitting module 1550 may include or be included in processing circuitry 1520. In particular embodiments, transmitting module 1550 may communicate with determining module 1552, LBT module 1554, and receiving module 1556.

Determining module 1552 may perform the determining functions of wireless device 110. For example, determining module 1552 may determine a reference subframe and determine a contention window size as described in any of the examples above, including FIGS. 9-14. In certain embodiments, determining module 1552 may include or be included in processing circuitry 1520. In particular embodiments, determining module 1552 may communicate with transmitting module 1550, LBT module 1554, and receiving module 1556.

LBT module 1554 may perform the listen-before-talk functions of wireless device 110. For example, LBT module 1554 may perform an LBT procedure with random backoff or perform a fixed duration clear channel assessment. LBT module 1554 may increment or rest a contention window size for performing LBT. In certain embodiments, LBT module 1554 may include or be included in processing circuitry 1520. In particular embodiments, LBT module 1554 may communicate with transmitting module 1550, determining module 1552, and receiving module 1556.

Receiving module 1556 may perform the receiving functions of wireless device 110. For example, receiving module 1556 may receive scheduling for a burst of uplink subframes. In certain embodiments, receiving module 1556 may include or be included in processing circuitry 1520. In particular embodiments, receiving module 1556 may communicate with transmitting module 1550, determining module 1552 and LBT module 1554.

FIG. 16A is a block diagram illustrating an example embodiment of a network node. The network node is an example of the network node 120 illustrated in FIG. 8. In particular embodiments, the network node is capable of managing contention window sizes and signaling the contention window size to a wireless device. For example, the network node may receive a first burst of uplink subframes from a wireless device after a first LBT procedure. Each subframe of the first burst of uplink subframes is associated with one or more transport blocks, and each transport block is associated with a HARQ process identifier. The network node determines a set of transport blocks in the first burst of uplink subframes that were not received successfully by the network node. Before scheduling the wireless device with a second LBT procedure, the network node schedules the wireless device with a second burst of uplink frames using all the HARQ process identifiers associated with the transport blocks in the determined set of transport blocks.

In particular embodiments, the network node determines a reference subframe based on the last subframe before a received subframe in which at least one transport block was received successfully. The set of transport blocks includes the transport blocks in the reference subframe that were not received successfully.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1610, at least one processing circuitry 1620, at least one memory 1630, and at least one network interface 1640. Transceiver 1610 facilitates transmitting wireless signals to and receiving wireless signals from a wireless device, such as wireless devices 110 (e.g., via an antenna); processing circuitry 1620 executes instructions to provide some or all of the functionality described above as being provided by a network node 120; memory 1630 stores the instructions executed by processing circuitry 1620; and network interface 1640 communicates signals to backend network components, such as a gateway, switch, router, Internet, Public Switched Telephone Network (PSTN), controller, and/or other network nodes 120. Processing circuitry 1620 and memory 1630 can be of the same types as described with respect to processing circuitry 1520 and memory 1530 of FIG. 15A above.

In some embodiments, network interface 1640 is communicatively coupled to processing circuitry 1620 and refers to any suitable device operable to receive input for network node 120, send output from network node 120, perform suitable processing of the input or output or both, communicate to other devices, or any combination of the preceding. Network interface 1640 includes appropriate hardware (e.g., port, modem, network interface card, etc.) and software, including protocol conversion and data processing capabilities, to communicate through a network.

In particular embodiments, processing circuitry 1620 in communication with transceiver 1610 determines a reference subframe for signaling information about contention window sizes.

Other embodiments of network node 120 include additional components (beyond those shown in FIG. 16A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 16B is a block diagram illustrating example components of a network node 120. The components may include receiving module 1650, determining module 1652 and LBT module 1654.

Receiving module 1650 may perform the receiving functions of network node 120. For example, receiving module 1650 may receive a burst of uplink subframes from a wireless device after an LBT procedure. In certain embodiments, receiving module 1650 may include or be included in processing circuitry 1620. In particular embodiments, receiving module 1650 may communicate with determining module 1652 and LBT module 1654.

Determining module 1652 may perform the determining functions of network node 120. For example, determining module 1652 may determine a set of transport blocks in the burst of uplink subframes that were not received successfully by the network node. In certain embodiments, determining module 1652 may include or be included in processing circuitry 1620. In particular embodiments, determining module 1652 may communicate with receiving module 1650 and LBT module 1654.

LBT module 1654 may perform the LBT functions of network node 120. For example, LBT module 1654 may schedule the wireless device with a second burst of uplink frames using all the HARQ process identifiers associated with the unsuccessfully received transport blocks. In certain embodiments, LBT module 1654 may include or be included in processing circuitry 1620. In particular embodiments, LBT module 1654 may communicate with receiving module 1650 and determining module 1652.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BTS Base Transceiver Station
CCA Clear Channel Assessment
CW Contention Window
D2D Device to Device
DCF Distributed Coordination Function
DIFS DCF Inter-Frame Spacing
DL Downlink
eNB eNodeB
FDD Frequency Division Duplex
HARQ Hybrid Automatic Repeat Request
LAA License Assisted Access
LBT Listen-Before-Talk
LTE Long Term Evolution
MAC Medium Access Control
M2M Machine to Machine
MIMO Multi-Input Multi-Output
MRBC Multiple Random Backoff Channels
MTC Machine Type Communication
NAK Negative Acknowledgement
NR New Radio
PDSCH Physical Downlink Shared Channel
PIFS PCF Inter-Frame Spacing
PUCCH Physical Uplink Control Channel
QCI QoS Class Indicator
QoS Quality of Service
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SCell Secondary Cell
SRBC Single Random Backoff Channel
SIFS Short Inter-Frame Spacing
TDD Time Division Duplex
UE User Equipment
UL Uplink
UTRAN Universal Terrestrial Radio Access Network
WAN Wireless Access Network

The invention claimed is:

1. A method for use in a network node of signaling listen-before-talk (LBT) parameters, the method comprising:
   receiving a first burst of uplink subframes from a user equipment (UE) after a first LBT procedure, each subframe of the first burst of uplink subframes associated with one or more transport blocks, and each transport block associated with a hybrid automatic repeat request (HARQ) process identifier;
   determining a set of transport blocks in the first burst of uplink subframes that were not received successfully by the network node; and
   before scheduling the UE with a second LBT procedure, scheduling the UE with a second burst of uplink subframes using all the HARQ process identifiers associated with the transport blocks in the determined set of transport blocks;
   wherein determining the set of transport blocks in the first burst of uplink subframes that were not received successfully by the network node comprises:
      determining a reference subframe based on the last subframe before a received subframe in which at least one transport block was received successfully.

2. The method of claim 1, wherein the set of transport blocks includes the transport blocks in the reference subframe that were not received successfully.

3. The method of claim 2, wherein determining the reference subframe comprises determining the first transmitted subframe of the first burst of uplink subframes for which the HARQ process identifier associated with the first subframe of the first burst of uplink subframes is also found in the second burst of uplink subframes.

4. The method of claim 1, wherein transmission of the first burst ended more than a threshold time prior to determining the reference subframe.

5. The method of claim 4, wherein the threshold time is 4 ms.

6. The method of claim 2, wherein the reference subframe is associated with a plurality of HARQ process identifiers.

7. A network node operable to signal listen-before-talk (LBT) parameters, the network node comprising processing circuitry operable to:
   receive a first burst of uplink subframes from a user equipment (UE) after a first LBT procedure, each subframe of the first burst of uplink subframes associated with one or more transport blocks, and each transport block associated with a hybrid automatic repeat request (HARQ) process identifier;

determine a set of transport blocks in the first burst of uplink subframes that were not received successfully by the network node; and before scheduling the UE with a second LBT procedure, schedule the UE with a second burst of uplink subframes using all the HARQ process identifiers associated with the transport blocks in the determined set of transport blocks;

wherein determining the set of transport blocks in the first burst of uplink subframes that were not received successfully by the network node comprises the processing circuitry being operable to:

determine a reference subframe based on the last subframe before a received subframe in which at least one transport block was received successfully.

8. The network node of claim 7, wherein the set of transport blocks includes the transport blocks in the reference subframe that were not received successfully.

9. The method of claim 8, wherein determining the reference subframe comprises determining the first transmitted subframe of the first burst of uplink subframes for which the HARQ process identifier associated with the first subframe of the first burst of uplink subframes is also found in the second burst of uplink subframes.

10. The method of claim 7, wherein transmission of the first burst ended more than a threshold time prior to determining the reference subframe.

11. The method of claim 10, wherein the threshold time is 4 ms.

12. The method of claim 8, wherein the reference subframe is associated with a plurality of HARQ process identifiers.

* * * * *